United States Patent
Ishihara et al.

(10) Patent No.: US 7,066,609 B2
(45) Date of Patent: Jun. 27, 2006

(54) PROJECTION-TYPE DISPLAY APPARATUS

(75) Inventors: Jun Ishihara, Kobe (JP); Yasumasa Sawai, Yamatotakada (JP); Takashi Ohta, Sakai (JP)

(73) Assignee: Konica Minolta Opto, Inc., Hachioji (JP)

( * ) Notice: Subject to any disclaimer, the term of this patent is extended or adjusted under 35 U.S.C. 154(b) by 0 days.

(21) Appl. No.: 10/689,391

(22) Filed: Oct. 20, 2003

(65) Prior Publication Data

US 2004/0135976 A1    Jul. 15, 2004

(51) Int. Cl.
*G03B 21/28* (2006.01)

(52) U.S. Cl. .......................................... 353/99; 349/5

(58) Field of Classification Search ................ 353/38, 353/98, 99, 31, 34, 37; 349/5, 7, 8
See application file for complete search history.

(56) References Cited

U.S. PATENT DOCUMENTS

| 6,129,437 | A | 10/2000 | Koga et al. ................... 353/98 |
| 6,322,219 | B1 * | 11/2001 | Okamori et al. .............. 353/98 |
| 6,499,852 | B1 * | 12/2002 | Kino et al. ................... 362/23 |
| 6,609,798 | B1 * | 8/2003 | Milinusic et al. ............. 353/98 |
| 6,626,541 | B1 * | 9/2003 | Sunaga ........................ 353/69 |
| 6,626,542 | B1 * | 9/2003 | Baba et al. ................... 353/98 |
| 2002/0191161 | A1 | 12/2002 | Baba et al. ................... 353/98 |
| 2004/0109146 | A1 * | 6/2004 | Liao et al. .................... 353/98 |
| 2004/0169829 | A1 * | 9/2004 | Kwon ......................... 353/98 |
| 2004/0184012 | A1 * | 9/2004 | Hori ........................... 353/99 |

* cited by examiner

*Primary Examiner*—William C. Dowling
(74) *Attorney, Agent, or Firm*—Sidley Austin LLP

(57) ABSTRACT

In a projection-type display apparatus that directs light from a light source through the illumination optical system to a display panel so that an image displayed on the display panel illuminated by the light directed thereto is projected through a projection optical system onto a screen, an illumination optical system is used that has a light intensity uniformizing device of which the entrance surface is located at a first conjugate position substantially conjugate with the light source and of which the exit surface has a shape geometrically similar to the panel surface of the display panel and a reflection optical system for forming an image of the exit surface of the light intensity uniformizing device on the panel surface of the display panel. In the reflection optical system, every surface having an optical power is a reflective surface.

25 Claims, 22 Drawing Sheets

PROJECTION-TYPE DISPLAY APPARATUS

This application is based on Japanese Patent Applications Nos. 2002-300791 and 2002-300800 both filed on Oct. 15, 2002, the contents of which are hereby incorporated by reference.

BACKGROUND OF THE INVENTION

1. Field of the Invention

The present invention relates to a projection-type display apparatus, and more particularly to a projection-type display apparatus provided with a reflection-type illumination optical system as illumination with which to project an image.

2. Description of the Prior Art

One conventionally known example of a reflection-type display panel for use in a projection-type display apparatus is a Digital Micromirror Device™. The Digital Micromirror Device is a binary spatial light modulator developed by Texas Instruments. The Digital Micromirror Device is provided with a plurality of micromirrors of which each is rotatable about an axis that is slanted at a predetermined angle (for example, 45°) relative to the longer or shorter sides thereof. Each pixel is turned on and off by bringing the corresponding micromirror into one of two states with different inclination angles (for example, ±12°). When a micromirror is in an ON state, the illumination light reflected therefrom is directed to the entrance pupil of a projection optical system and then reaches a screen. By contrast, when the micromirror is in an OFF state, the illumination light reflected therefrom is directed in a direction deviated from the entrance pupil of the projection optical system, and thus produces no image on the screen.

In a projection-type display apparatus incorporating a Digital Micromirror Device, which operates as described above, the entire image presented on the Digital Micromirror Device needs to be illuminated from an oblique direction so that the illumination light reflected from micromirrors in their ON state is efficiently directed to the entrance pupil of a projection optical system. Simultaneously, the illumination light reflected from micromirrors in their OFF state needs to be kept from entering the entrance pupil of the projection optical system. To achieve this, various types of illumination optical system have been conventionally proposed. For example, U.S. Pat. No. 6,129,437 proposes an illumination optical system provided with an elliptical mirror and a condenser lens.

Using a lens in an illumination optical system results in chromatic aberration, and correcting it requires an increased number of components. As compared with a lens surface, a reflective surface can be given a stronger optical power per surface, and therefore using a reflective surface in an illumination optical system helps not only to reduce the number of components but also to prevent chromatic aberration. However, using a reflective surface in combination with a lens surface as practiced in the illumination optical system proposed in the aforementioned patent publication makes it difficult to obtain satisfactory optical performance as expected in an illumination optical system, and thus leads to an unduly expensive and large display apparatus.

SUMMARY OF THE INVENTION

An object of the present invention is to provide an inexpensive, compact projection-type display apparatus incorporating an illumination optical system with high optical performance.

To achieve the above object, according to one aspect of the present invention, an illumination optical system for use in a projection-type display apparatus that directs light from a light source through the illumination optical system to a display panel so that an image displayed on the display panel illuminated by the light directed thereto is projected through a projection optical system onto a screen is provided with: a light intensity uniformizing device of which the entrance surface is located at a first conjugate position that is substantially conjugate with the light source and of which the exit surface has a shape geometrically similar to the panel surface of the display panel; and a reflection optical system for forming an image of the exit surface of the light intensity uniformizing device on the panel surface of the display panel. Here, in the reflection optical system, every surface having an optical power is a reflective surface.

According to another aspect of the present invention, a projection-type display apparatus is provided with: a light source for emitting light; a display panel for displaying an image; a condenser optical system for condensing light from the light source at a first conjugate position; a light intensity uniformizing device of which the entrance surface is located at the first conjugate position and of which the exit surface has a shape geometrically similar to the panel surface of the display panel; a reflection optical system for forming an image of the exit surface of the light intensity uniformizing device on the panel surface of the display panel; and a projection optical system for projecting the image displayed by the display panel onto a predetermined surface. Here, in the reflection optical system, every surface having an optical power is a reflective surface.

According to still another aspect of the present invention, a rear projection apparatus is provided with: a light source for emitting light; a display panel for displaying an image; a condenser optical system for condensing light from the light source at a first conjugate position; a light intensity uniformizing device of which the entrance surface is located at the first conjugate position and of which the exit surface has a shape geometrically similar to the panel surface of the display panel; a color filter, disposed near the entrance surface or exit surface of the light intensity uniformizing device, for changing colors of the light exiting from the light intensity uniformizing device on a time-division basis to achieve color display; a reflection optical system for forming an image of the exit surface of the light intensity uniformizing device on the panel surface of the display panel, wherein every surface having an optical power is a reflective surface; a projection optical system for projecting the image displayed by the display panel onto a predetermined surface; and a transmission-type screen onto which the projection optical system projects the image.

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

Figure 1:
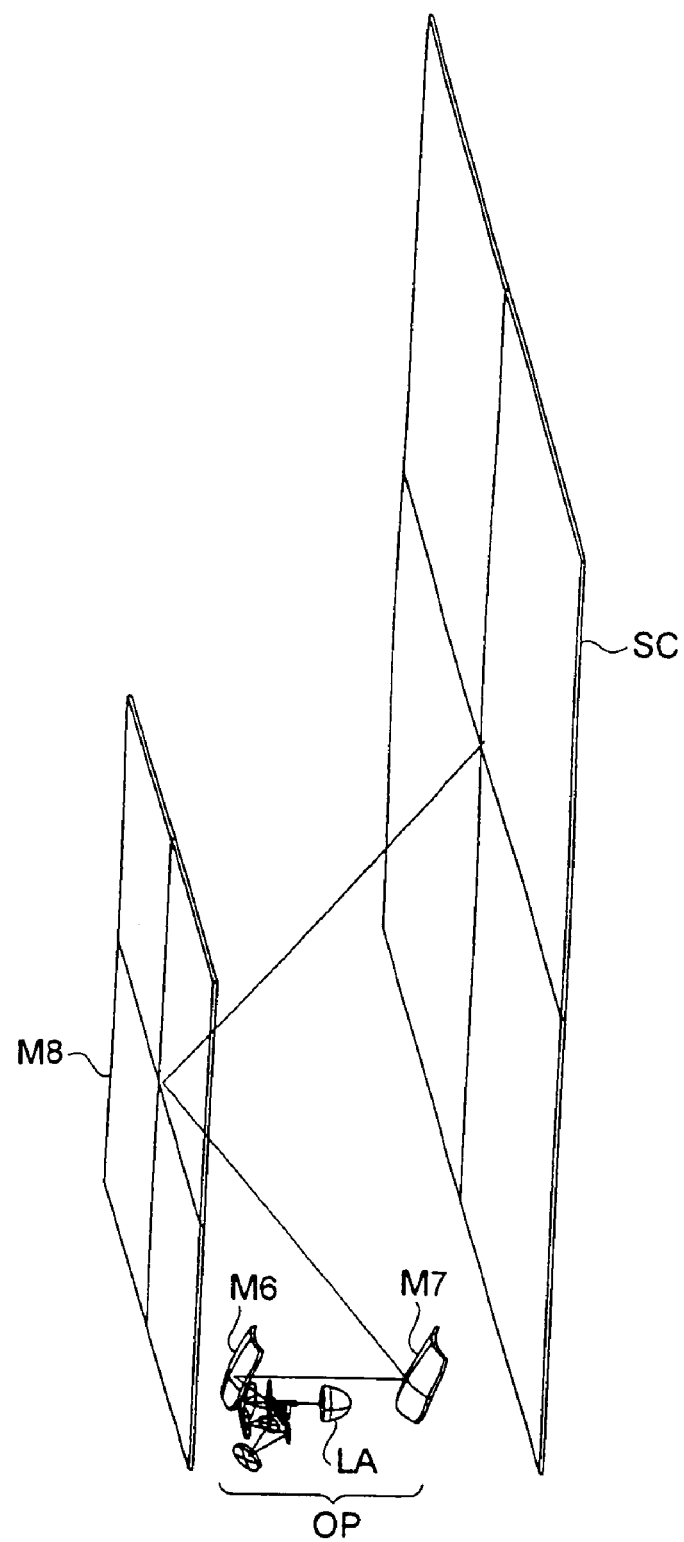
FIG. 1 is a perspective view showing the entire system of the projection-type display apparatus of a first embodiment of the invention.
Figure 2:
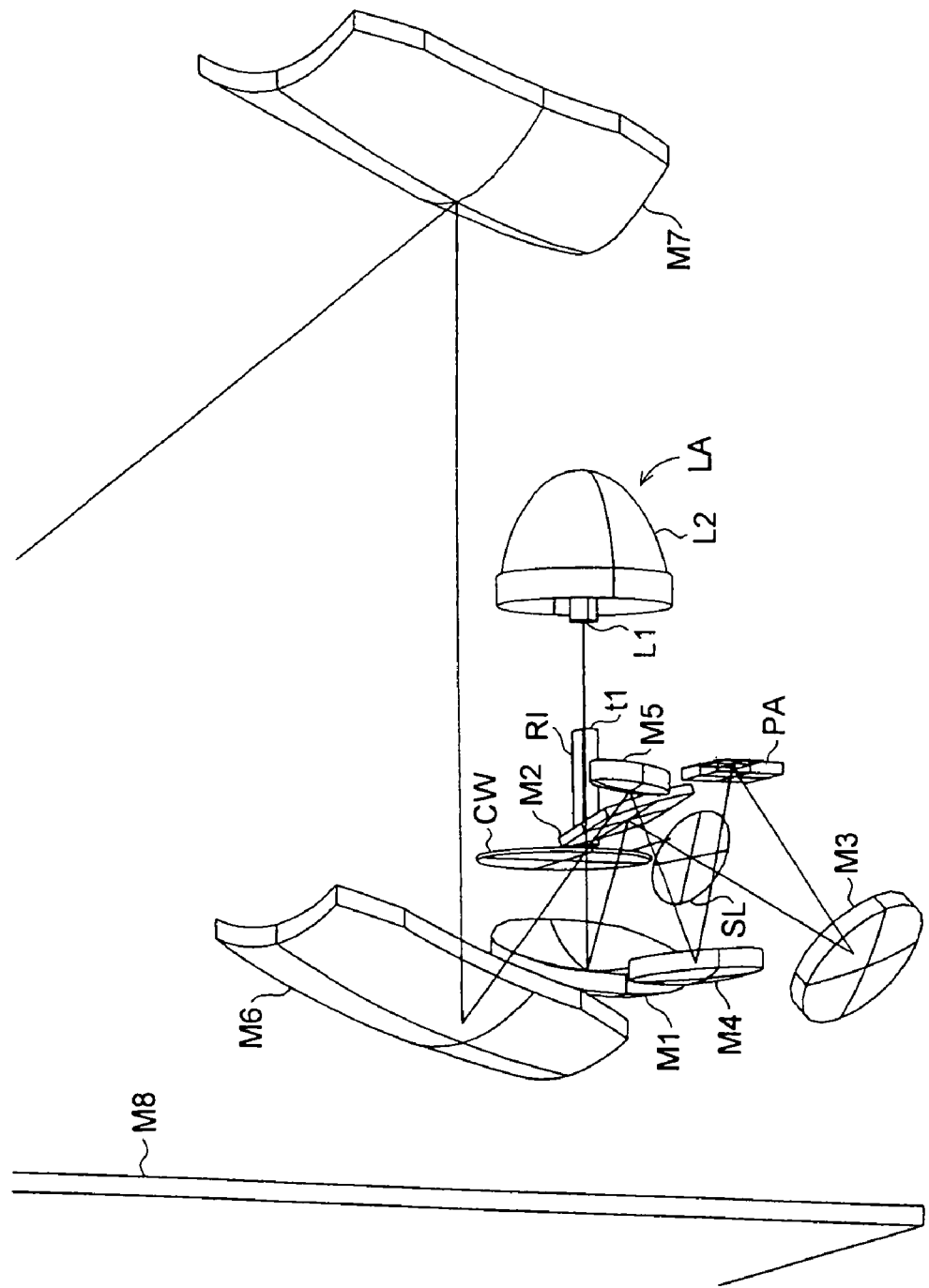
FIG. 2 is a perspective view showing an outline of the construction of a principal portion of the projection-type display apparatus of the first embodiment.
Figure 3:
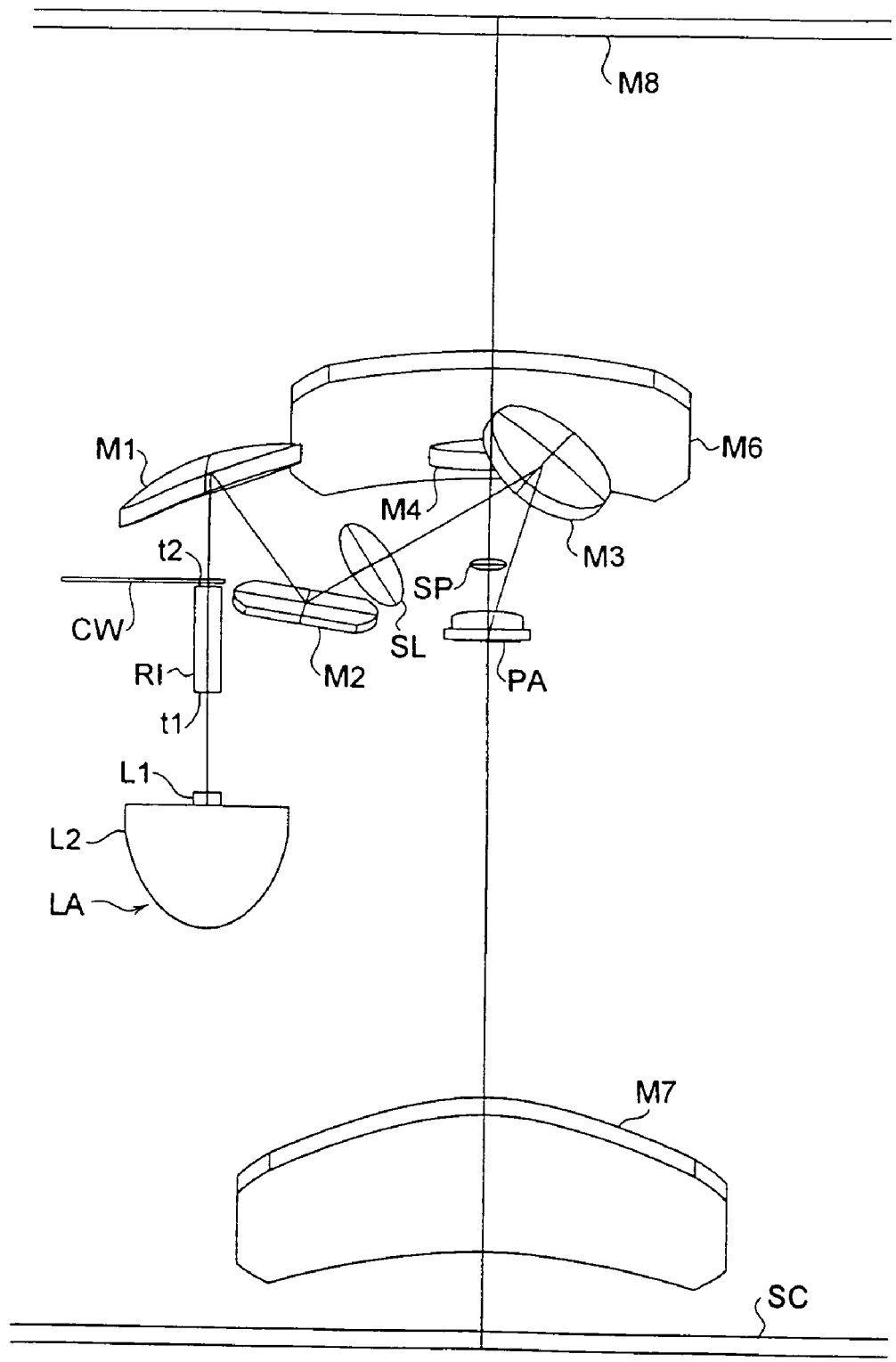
FIG. 3 is a bottom view showing an outline of the construction of a principal portion of the projection-type display apparatus of the first embodiment.
Figure 4:
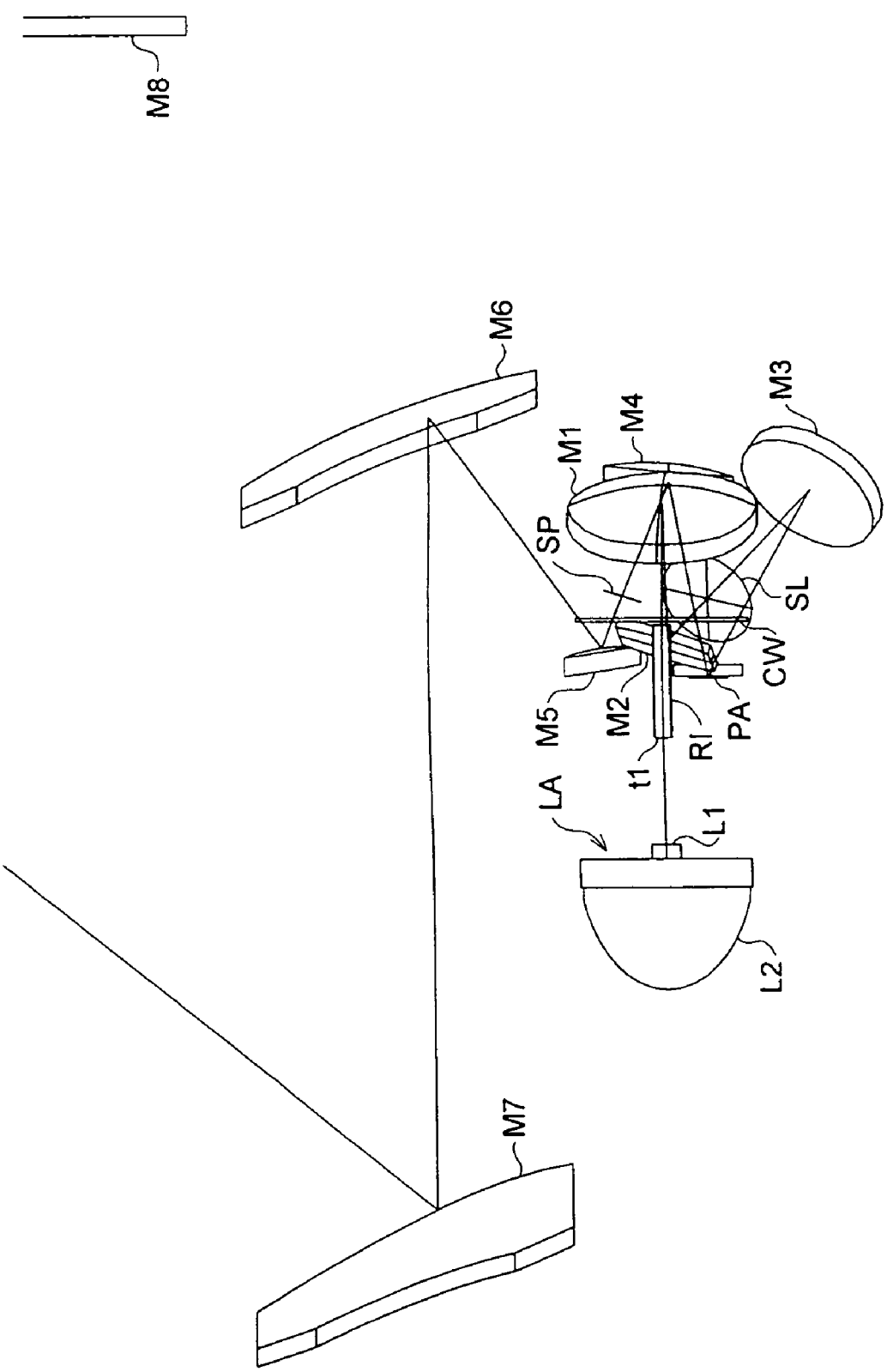
FIG. 4 is a side view showing an outline of the construction of a principal portion of the projection-type display apparatus of the first embodiment.

Hereinafter, projection-type display apparatuses embodying the present invention will be described with reference to the drawings. FIGS. 1 to 4 show the projection-type display apparatus of a first embodiment of the invention. The first embodiment deals with a rear projection apparatus. FIG. 1 is a perspective view showing an outline of the optical construction of the entire display apparatus, and FIGS. 2 to 4 are a perspective view, a bottom view, and a side view, respectively, showing a principal portion thereof. In FIGS. 1 to 4, the following symbols are used: LA represents a light source lamp, L1 represents a light source, L2 represents an elliptic reflector, RI represents a rod integrator, CW represents a color wheel, M1 to M8 represent a first to an eighth mirror, SL represents an illumination optical system pupil, SP represents a projection optical system pupil, PA represents a display panel, OP represents an optical engine portion, and SC represents a transmission-type screen. Here, the display panel PA is assumed to be a Digital Micromirror Device. However, the display panel PA may be of any other type so long as it is suitable for the projection optical system PL described later; for example, it may be a non-illuminant, reflective (or transmissive) display device or light valve (such as a liquid crystal display device).

Figure 5:
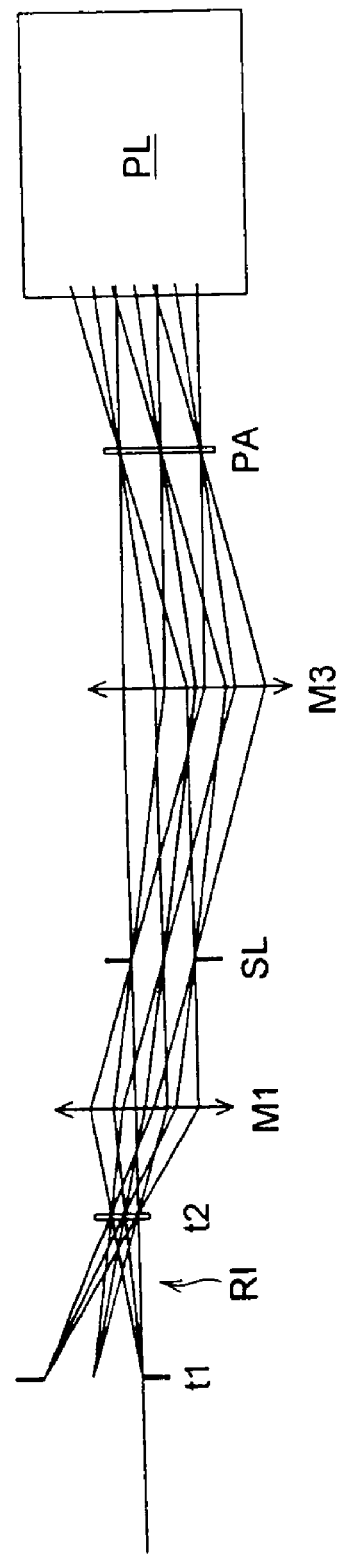
FIG. 5 is an optical construction diagram showing, with the optical path straightened, a principal portion of the optical engine portion of the display apparatus shown in FIGS. 1 to 4.

As shown in FIG. 1, the components starting with the light source lamp LA and ending with the seventh mirror M7 constitute the optical engine portion OP, which is the principal portion of the projection-type display apparatus. In this optical engine portion OP, as shown in FIGS. 2 to 4, the elliptic reflector L2, the rod integrator RI, the color wheel CW, and the first to third mirrors M1 to M3 constitute an illumination optical system, by which the light from the light source L1 is directed to the display panel PA. FIG. 5 shows a principal portion thereof, with the optical path straightened. In FIG. 5, reflective optical elements are replaced with transmissive ones so that the optical layout of that portion and how rays pass therethrough are shown schematically. The image displayed on the display panel PA illuminated by the illumination optical system is projected through a projection optical system PL (FIG. 5), which is constituted by the fourth to eighth mirrors M4 to M8, onto the transmission-type screen SC.

Now, the construction of the individual portions will be described in more detail. As shown in FIGS. 2 to 4, the light source lamp LA is constituted by the light source L1 and the elliptic reflector L2. The light source L1 emits white light. The elliptic reflector L2 functions as a condenser optical system that condenses the light from the light source L1 to form a secondary light source, and is so designed that the light emitted from the light source L1 is imaged near the entrance end surface t1 of the rod integrator RI. Instead of the elliptic reflector L2, a paraboloidal, spherical, or other mirror may be used. In that case, to condense the light from the light source L1, a condenser lens or the like needs to be combined with that mirror so as to constitute the condenser optical system.

The light emitted from the light source lamp LA enters the rod integrator RI. The rod integrator RI is composed of four flat mirrors fitted together so as to function as a light intensity uniformizing device of a hollow rod type. As described above, the rod integrator RI has the entrance end surface t1 thereof located near the secondary light source. The light that has entered the rod integrator RI through the entrance end surface t1 thereof is repeatedly reflected on the side surfaces (i.e., inner wall surfaces) thereof and is thereby subjected to mixing, so that, when the light exits from the rod integrator RI through the exit end surface t2 thereof, it has its spatial energy distribution made uniform. The entrance end surface t1 and the exit end surface t2 of the rod integrator RI are rectangular in shape so as to be geometrically similar to the display panel PA. Moreover, as will be understood from FIG. 5, the entrance end surface t1 of the rod integrator RI is conjugate with the illumination optical system pupil SL, and the exit end surface t2 of the rod integrator RI is conjugate with the panel surface of the display panel PA. The aforementioned mixing achieves uniformly distributed brightness at the exit end surface t2, and thus the display panel PA is illuminated efficiently and uniformly. The rod integrator RI may be of any other type than one in the shape of a hollow rod; for example, it may be a glass rod formed of a glass member in the shape of a rectangular prism. Moreover, the rod integrator RI may have any other number of side faces than four so long as the number suits the shape of the panel surface of the display panel PA. Thus, used as the rod integrator RI is a hollow column-shaped member composed of a plurality of reflective mirrors fitted together, a glass member in the shape of a polygonal prism, or the like.

Near the exit end surface t2 of the rod integrator RI is disposed the color wheel CW, which changes colors of the light exiting from the rod integrator RI on a time-division basis to achieve color display. The color wheel CW turns white light into, for example, red (R), green (G), and blue (B) light on a time-division basis. The color wheel CW is composed of color filters that permit the display panel PA to be illuminated on a color sequential basis; that is, as the filters rotate, they permit the illumination light to pass through different portions thereof and thereby permit light of different colors to exit therefrom. The color wheel CW may be disposed anywhere else than near the exit end surface t2 of the rod integrator RI; it may be disposed wherever suits the arrangement of the other optical elements, for example near the entrance end surface t1 of the rod integrator RI. A UV (ultraviolet)-IR (infrared) cut filter may be additionally disposed so that ultraviolet and infrared rays are removed from the illumination light.

The light that has exited from the color wheel CW enters a reflection optical system constituted by the first to third mirrors M1 to M3. The reflection optical system forms an image of the exit end surface t2 of the rod integrator RI on the panel surface of the display panel PA. Here, the optical power with which this image is formed is distributed between the first and third mirrors M1 and M3. Specifically, the first and third mirrors M1 and M3 each have a concave reflective surface, and the second mirror M2 has a flat reflective surface. The concave reflective surface of the first mirror M1 permits the second light source located near the entrance end surface t1 of the rod integrator RI to be re-imaged to form a tertiary light source near the illumination optical system pupil SL. The light from the tertiary light source is directed to the display panel PA by the concave reflective surface of the third mirror M3. The light that has struck the display panel PA is reflected by the individual micromirrors thereof, which are each in either an ON or an OFF state (for example, inclined at either end of ±12°), and is thereby spatially modulated. Here, only the light reflected from micromirrors in their ON state enters the projection optical system PL, which is constituted by the fourth to eighth mirrors M4 to M8, and is then efficiently directed to the entrance pupil SP of the projection optical system PL by the optical power of the concave reflective surface of the third mirror M3. The light is then projected through the projection optical system PL onto the transmission-type screen SC.

In the first embodiment, as described above, the reflection optical system has only two concave reflective surfaces as optical surfaces having optical powers. This makes it possible to reduce the number of components used in the illumination optical system and thereby make it compact. Moreover, since no chromatic aberration is produced, no unevenness in color results. This helps reduce the lowering of illuminance. Thus, it is possible to use optical components that are compact and advantageous in terms of mass production and costs while maintaining satisfactory optical performance. In this way, it is possible to reduce the size and cost of the display apparatus and simultaneously enhance the performance thereof.

Moreover, as will be understood from the optical path shown in FIG. 5, the projection optical system PL is designed to be obliquely telecentric toward the display panel PA. A telecentric optical system is so designed that, among the rays traveling from the display panel to the projection optical system, the principal rays at different image heights are substantially parallel to one another. This makes it possible to give substantially equal sizes to the illumination optical system and the projection optical system. However, this increases the optical burden on the projection optical system, and thus leads to, among others, the disadvantage that, to obtain satisfactory optical performance, it is necessary to increase the number of lens elements. By using two mirrors M1 and M3 having concave reflective surfaces as optical elements having optical powers in the illumination optical system as in this embodiment, it is possible to build an illumination optical system composed, in principle, of the minimal number of optical elements. Thus, it is possible to build an illumination optical system that is suitable for a projection optical system PL that is telecentric toward the display panel PA. The reduced number of reflective surfaces results in reduced reflection loss, and thus leads to bright display.

In the first embodiment, the first mirror M1, which functions as a relay lens, is disposed between the exit end surface t2 of the rod integrator RI and the illumination optical system pupil SL, and the first mirror M1 is given an optical power that makes the entrance end surface t1 of the rod integrator RI conjugate with the illumination optical system pupil SL. Moreover, the third mirror M3, which functions as a condenser lens, is disposed between the illumination optical system pupil SL and the display panel PA, and the third mirror M3 is given an optical power that, when combined with that of the fourth mirror M4, which is disposed on the display panel PA side of the projection optical system pupil SP, makes the illumination optical system pupil SL conjugate with the projection optical system pupil SP. In addition, the first mirror M1, which functions as a relay lens, and the third mirror M3, which functions as a condenser lens, are so arranged as to make the exit end surface t2 of the rod integrator RI conjugate with the panel surface of the display panel PA. In this construction, the light exiting from the rod integrator RI through the exit end surface t2 thereof can be efficiently directed to the small-size display panel PA, and the light reflected from this panel surface can be efficiently directed to the projection optical system PL. This makes it possible to alleviate the lowering of illuminance while maintaining high optical performance in the illumination optical system. Moreover, it is possible to reduce the cost and size of the display apparatus.

Figure 22:
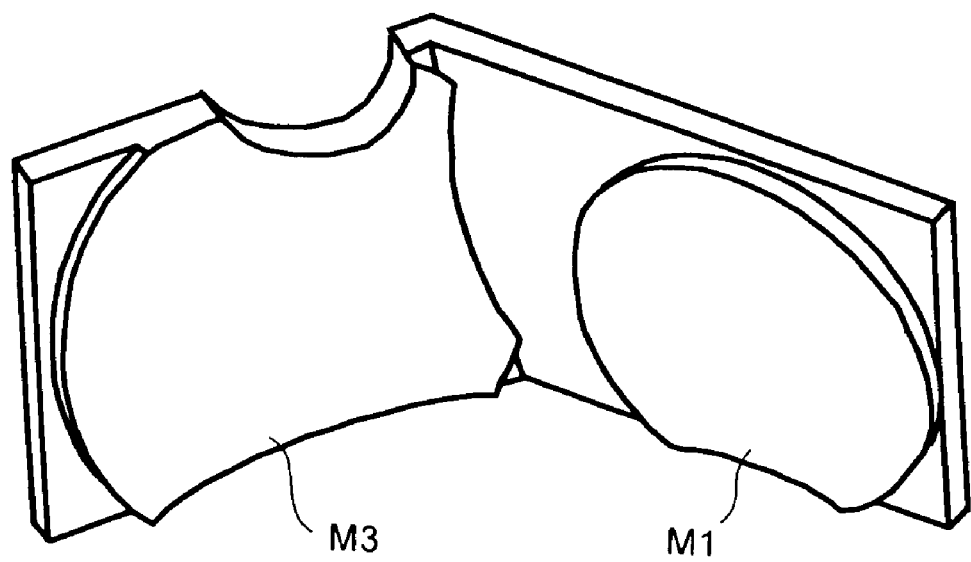
FIG. 22 is a perspective view showing the first and third mirrors integrated together into a single component.

Moreover, between the first and third mirrors M1 and M3, which each have a concave reflective surface, the second mirror M2, which has a flat reflective surface, bends the optical path so that the direction of the optical axis of the rod integrator RI is substantially coincident with the direction normal to the panel surface of the display panel PA. It is preferable, in this way, to dispose a flat reflective surface between two concave reflective surfaces so that the direction of the optical axis of the rod integrator RI is substantially coincident with the direction normal to the panel surface of the display panel PA or that the optical axis of the rod integrator RI is substantially parallel to the optical axis of the projection optical system PL. Bending the optical path between the first and third mirrors M1 and M3 makes it possible to make the optical construction of the display apparatus as a whole compact. It is also possible to unify the design reference axis and thereby reduce errors, simplify position adjustment, obtain more freedom in layout, and obtain other advantages. Moreover, it is preferable, as shown in FIG. 22, to form the first and third mirrors M1 and M3 as a single component and thereby integrate the two concave reflective surfaces together into a single component. This makes it possible to reduce the number of components, reduce errors, and enhance accuracy.

The concave reflective surfaces formed on the first and third mirrors M1 and M3 are both free-form surfaces. In a case where, as in this embodiment, an illumination optical system is composed solely of optical powers of reflective surfaces, using a free-form surface as at least one of those reflective surfaces makes it possible to enhance illumination efficiency accordingly. For example, in a case where a Digital Micromirror Device is used as the display panel PA, oblique illumination of its panel surface is essential. Using a free-form surface makes it possible to satisfactorily correct aberrations such as distortion even in oblique illumination. This makes it possible to efficiently direct light to the entrance pupil SP of the projection optical system PL and thereby achieve brighter display. That is, it is possible to enhance the imaging performance (how free from unsharpness and distortion) on the display panel PA, which is conjugate with the exit end surface t2 of the rod integrator RI. Thus, it is possible to efficiently condense the light reflected from the display panel PA at the entrance pupil SP of the projection optical system PL and thereby enhance illumination efficiency. It is also possible reduce position-to-position variation of luminance on the screen and thereby reduce unevenness in brightness.

In the first embodiment, the reason that free-form surfaces are used as the concave reflective surfaces of the first and third mirrors M1 and M3 is that using free-form surfaces as the concave reflective surface closest to the display panel PA and as the concave reflective surface closest to the exit end surface t2 of the rod integrator RI is effective in enhancing illumination efficiency and reducing brightness unevenness mentioned above. In a case where a Digital Micromirror Device is used as the display panel PA, using a free-form surface as the concave reflective surface closest to the display panel PA makes it possible to efficiently direct the illumination light reflected from micromirrors in their ON state to the projection optical system pupil SP. This makes it possible to effectively enhance illumination efficiency and reduce brightness unevenness. Moreover, using a free-form surface as the concave reflective surface closest to the exit end surface t2 of the rod integrator RI makes it possible to satisfactorily correct the aberrations produced when the exit end surface t2 is imaged on the display panel PA. This makes it possible to further effectively enhance illumination efficiency by reducing distortion and unsharpness.

Assuming that the vertical and horizontal directions of the panel surface of the display panel PA are the y-axis and z-axis directions, respectively, the concave reflective surfaces of the first and third mirrors M1 and M3 are both free-form surfaces that are shaped asymmetrically in each of the y-axis and z-axis directions. It is preferable, in this way, to use as at least one of the concave reflective surfaces included in the reflection optical system a free-form surface that is shaped asymmetrically in each of the y-axis and z-axis directions. This makes it easy to control the directions in which rays are reflected at different positions on the concave reflective surface, and thus helps enhance optical performance in terms of imaging and distortion. Moreover, in this embodiment, as will be understood from FIGS. 3 and 4, the object surface (the exit end surface t2 of the rod integrator RI) and the image surface (the panel surface of the display panel PA) are large mainly in the z-axis direction, and the free-form surfaces used as the individual concave reflective surfaces are optimized so as to have shapes that reflect such a layout.

It is preferable that the concave reflective surface having the free-form surface fulfill condition (i) below with respect to the radius of curvature thereof at the point at which the ray traveling from the center of the exit end surface t2 of the rod integrator RI through the display panel PA to the center of the entrance pupil SP of the projection optical system PL strikes the concave reflective surface having the free-form surface, and that this free-form surface not have plane-symmetry. This construction makes it possible to enhance optical performance, reduce distortion, and enhance imaging performance. This in turn makes it possible to enhance illumination efficiency.

$$|CRy| < |CRz| \qquad (i)$$

where
- CRz represents the radius of curvature as measured in the plane including both the ray incident on the concave reflective surface having the free-form surface and the ray reflected therefrom; and
- CRy represents the radius of curvature as measured in the plane that is perpendicular to the plane including both the ray incident on the concave reflective surface having the free-form surface and the ray reflected therefrom and that includes the normal vector to that concave reflective surface.

The substrates on which the reflective surfaces of the mirrors M1 to M8 are formed may be made of any material, such as glass, plastics, metal, or ceramics to suit the actual needs. For example, to prevent deterioration of imaging performance resulting from variation in temperature, it is preferable to use a material that suffers little shape change, such as glass. To reduce costs, it is preferable to use a plastic material such as PMMA (polymethyl metharcylate) or PC (polycarbonate). To obtain high illumination efficiency, the substrate needs to be coated with a coating having high reflectivity; specifically, on the substrate is formed a metal reflective thin film of Al (aluminum), Ag (silver), or the like, or an enhanced reflection film coated with a dielectric layer. The substrate may be coated with, instead, a multiple-layer film composed of several tens of dielectric layers. This is preferable because, as opposed to in a case where a metal film is used, light is not absorbed by metal and thus is not converted into heat during actual use. It is preferable that the reflectivity of the reflective surface to visible light be largely 90% or higher.

Figure 11:
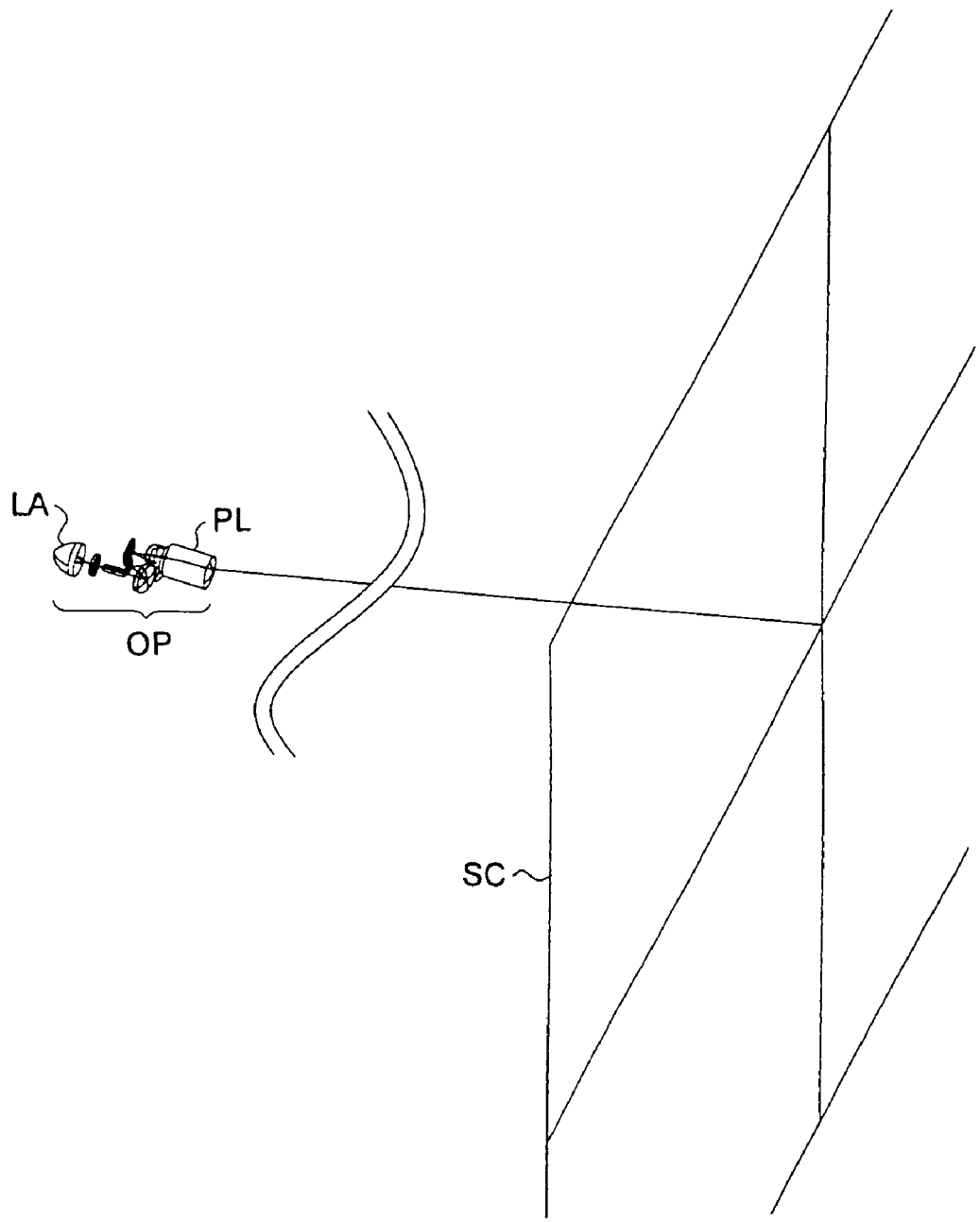
FIG. 11 is a perspective view showing the entire system of the projection-type display apparatus of a second embodiment of the invention.
Figure 12:
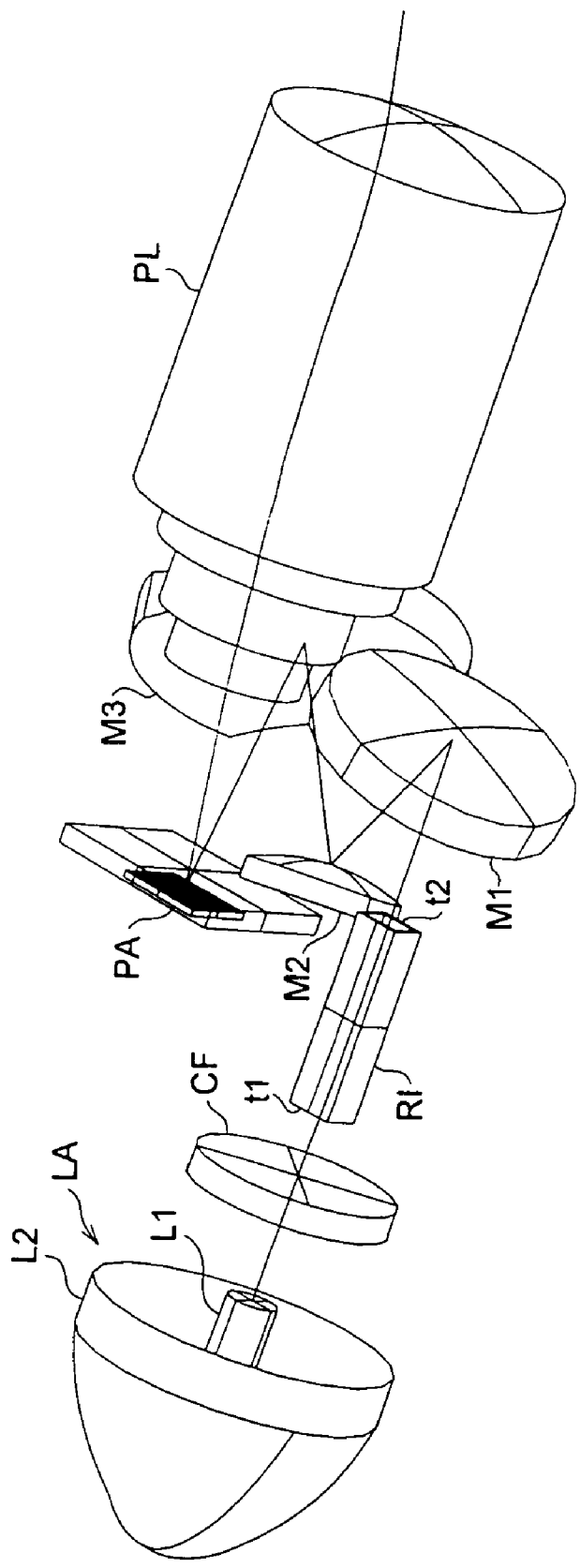
FIG. 12 is a perspective view showing an outline of the construction of a principal portion of the projection-type display apparatus of the second embodiment.
Figure 13:
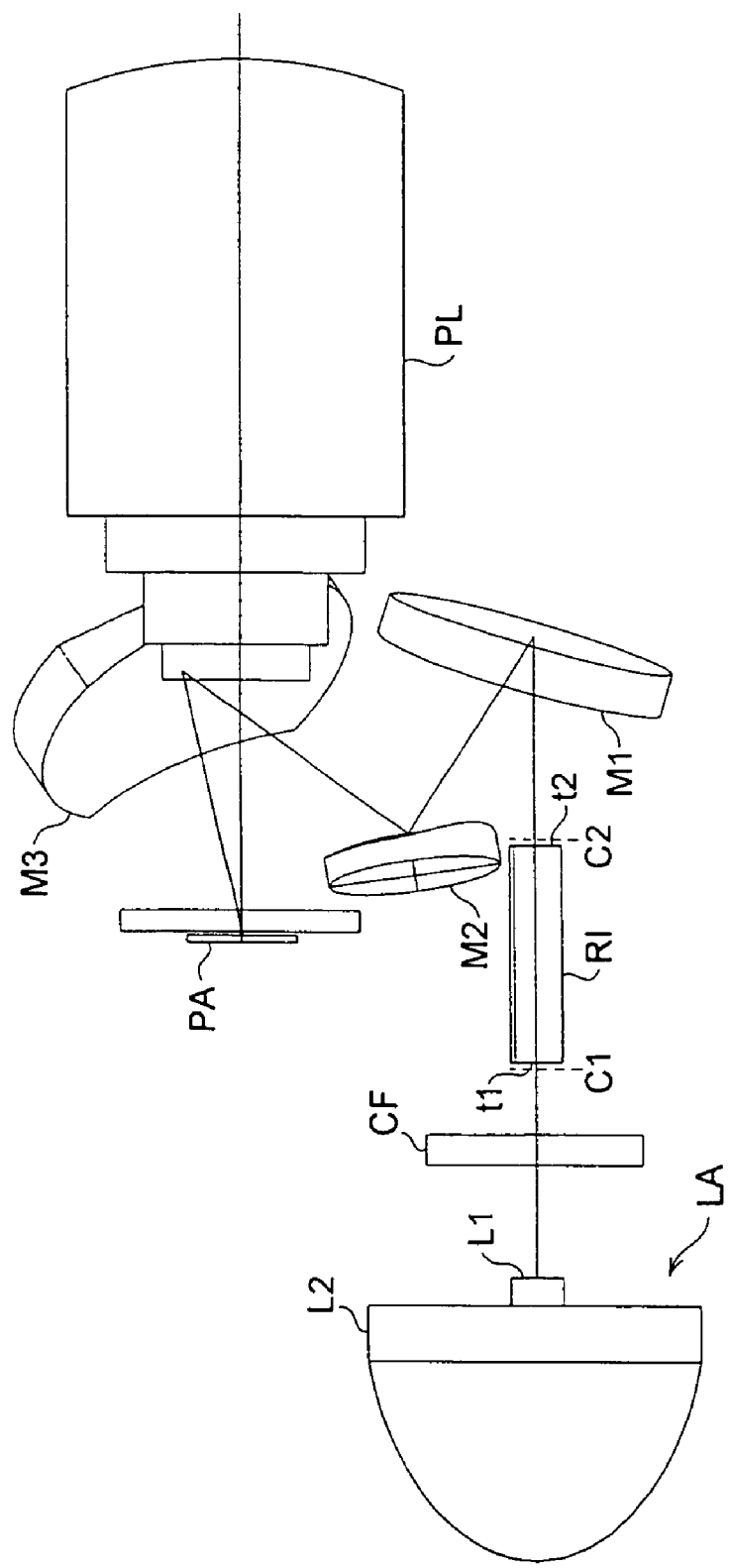
FIG. 13 is a top view showing an outline of the construction of a principal portion of the projection-type display apparatus of the second embodiment.
Figure 14:
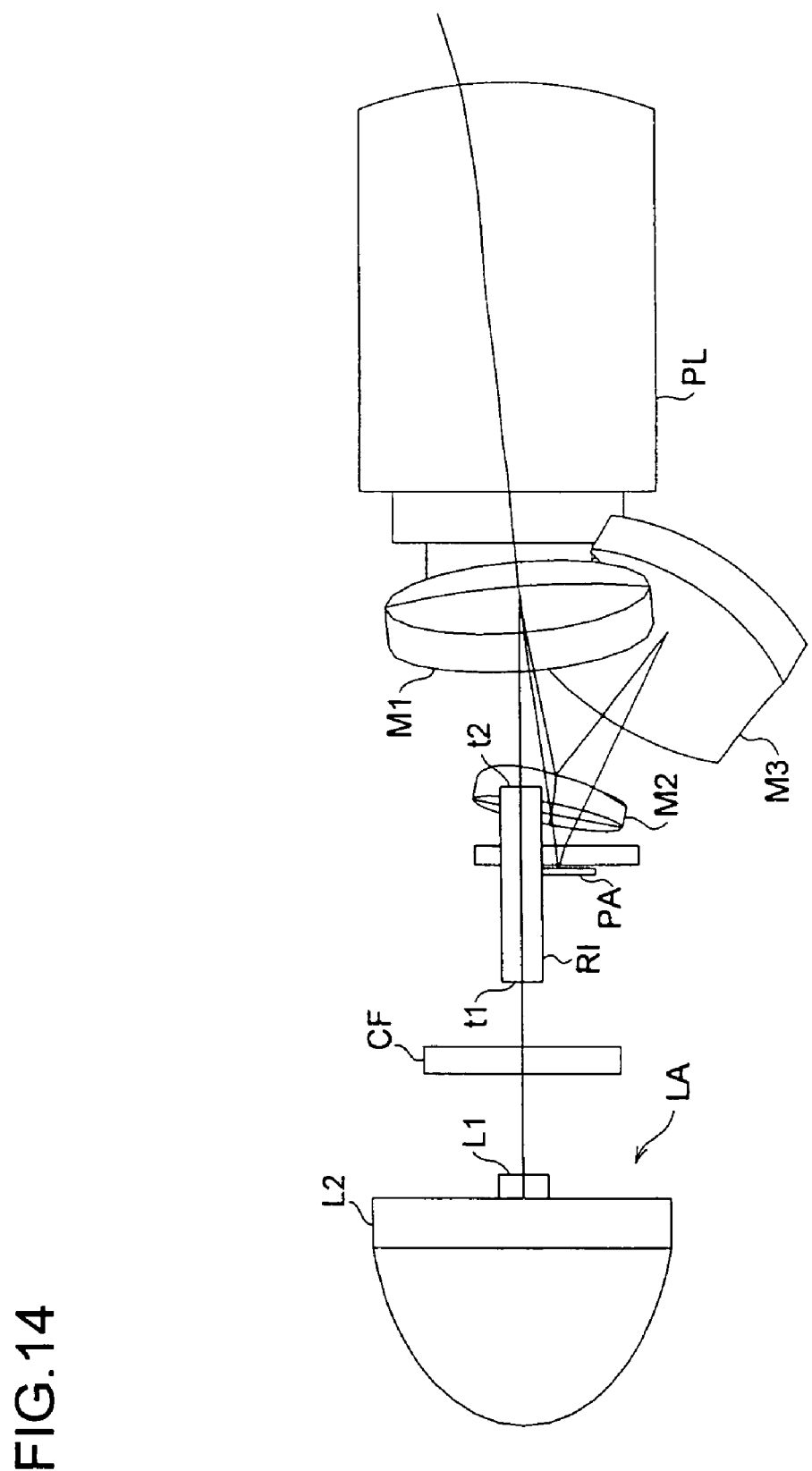
FIG. 14 is a side view showing an outline of the construction of a principal portion of the projection-type display apparatus of the second embodiment.

FIGS. 11 to 14 show the projection-type display apparatus of a second embodiment of the invention. FIG. 11 is a perspective view showing an outline of the optical construction of the entire display apparatus, and FIGS. 12 to 14 are a perspective view, a top view, and a side view, respectively, showing a principal portion thereof. In FIGS. 11 to 14, the following symbols are used: LA represents a light source lamp, L1 represents a light source, L2 represents an elliptic reflector, CF represents a UV (ultraviolet)-IR (infrared) cut filter, RI represents a rod integrator, M1 to M3 represent a first to a third mirror, PA represents a display panel, PL represents a projection optical system, OP represents an optical engine portion, and SC represents a screen. Here, the display panel PA is assumed to be a Digital Micromirror Device. However, the display panel PA may be of any other type so long as it is suitable for the projection optical system PL; for example, it may be a non-illuminant, reflective (or transmissive) display device or light valve (such as a liquid crystal display device).

Figure 15:
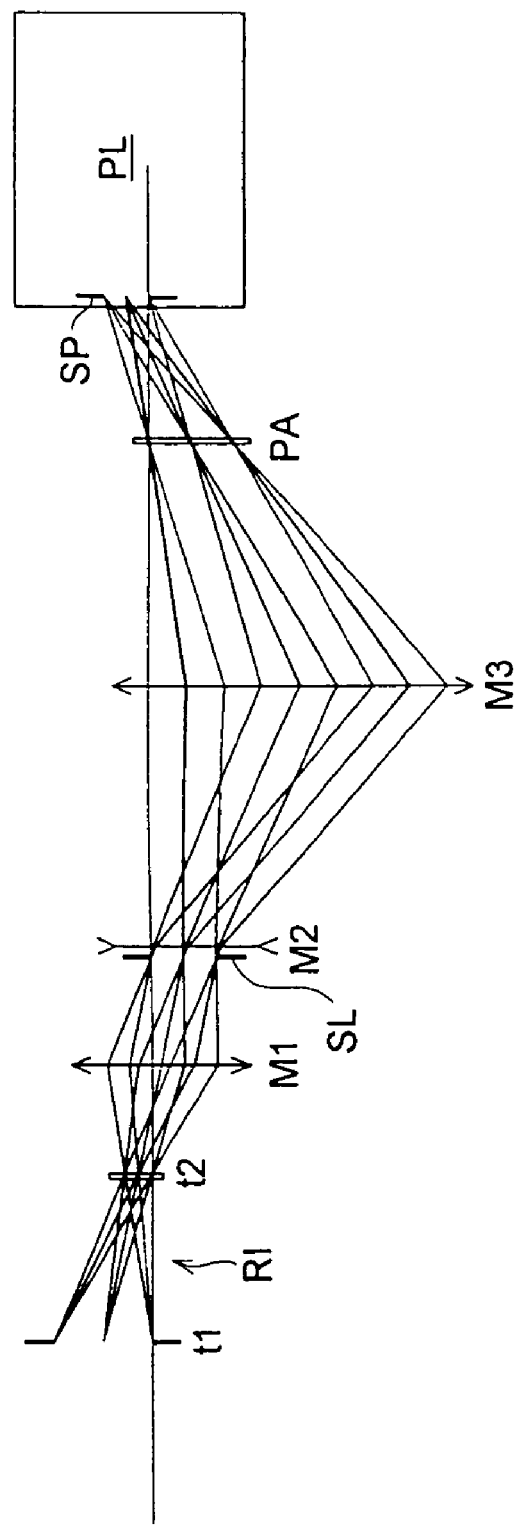
FIG. 15 is an optical construction diagram showing, with the optical path straightened, a principal portion of the optical engine portion of the display apparatus shown in FIGS. 11 to 14.

As shown in FIG. 11, the components starting with the light source lamp LA and ending with the projection optical system PL constitute the optical engine portion OP, which is the principal portion of the projection-type display apparatus. In this optical engine portion OP, as shown in FIGS. 12 to 14, the elliptic reflector L2, the UV-IR cut filter CF, the rod integrator RI, and the first to third mirrors M1 to M3 constitute an illumination optical system, by which the light from the light source L1 is directed to the display panel PA. FIG. 15 shows a principal portion thereof, with the optical path straightened. In FIG. 15, reflective optical elements are replaced with transmissive ones so that the optical layout of that portion and how rays pass therethrough are shown schematically. The image displayed on the display panel PA illuminated by the illumination optical system is projected through the projection optical system PL onto the screen SC. Though not specifically illustrated in the figures, a color wheel is disposed near the entrance end surface t1 or exit end surface t2 of the rod integrator RI (for example, at the position C1 or C2 in FIG. 13) to illuminate the display panel PA on a color sequential basis. The color wheel is composed of color filters that change colors of the light exiting therefrom on a time-division basis to achieve color display, and, as the filters rotate, they permit the illumination light to pass through different portions thereof and thereby permit light of different colors to exit therefrom. The color wheel turns white light into, for example, red (R), green (G), and blue (B) light on a time-division basis.

Now, the construction of the individual portions will be described in more detail. As shown in FIGS. 12 to 14, the light source lamp LA is constituted by the light source L1 and the elliptic reflector L2. The light source L1 emits white light. The elliptic reflector L2 functions as a condenser optical system that condenses the light from the light source L1 to form a secondary light source, and is so designed that the light emitted from the light source L1 is imaged near the entrance end surface t1 of the rod integrator RI. Instead of the elliptic reflector L2, a paraboloidal, spherical, or other mirror may be used. In that case, to condense the light from the light source L1, a condenser lens or the like needs to be combined with that mirror so as to constitute the condenser optical system.

The light that has exited from the elliptic reflector L2 passes through the UV-IR cut filter CF, which eliminates ultraviolet and infrared rays from the light, and then enters the rod integrator RI. The rod integrator RI is composed of four flat mirrors fitted together so as to function as a light intensity uniformizing device of a hollow rod type. As described above, the rod integrator RI has the entrance end surface t1 thereof located near the secondary light source. The light that has entered the rod integrator RI through the entrance end surface t1 thereof is repeatedly reflected on the side surfaces (i.e., inner wall surfaces) thereof and is thereby subjected to mixing, so that, when the light exits from the rod integrator RI through the exit end surface t2 thereof, it has its spatial energy distribution made uniform. The entrance end surface t1 and the exit end surface t2 of the rod integrator RI are rectangular in shape so as to be geometrically similar to the display panel PA. Moreover, as will be understood from FIG. 15, the entrance end surface t1 of the rod integrator RI is conjugate with the illumination optical system pupil SL, and the exit end surface t2 of the rod integrator RI is conjugate with the panel surface of the display panel PA. The aforementioned mixing achieves uniformly distributed brightness at the exit end surface t2, and thus the display panel PA is illuminated efficiently and uniformly. The rod integrator RI may be of any other type than one in the shape of a hollow rod; for example, it may be a glass rod formed of a glass member in the shape of a rectangular prism. Moreover, the rod integrator RI may have any other number of side faces than four so long as the number suits the shape of the panel surface of the display panel PA. Thus, used as the rod integrator RI is a hollow column-shaped member composed of a plurality of reflective mirrors fitted together, a glass member in the shape of a polygonal prism, or the like.

The light that has exited from the rod integrator RI enters a reflection optical system constituted by the first to third mirrors M1 to M3. The reflection optical system forms an image of the exit end surface t2 of the rod integrator RI on the panel surface of the display panel PA. Here, in the reflection optical system, the first and third mirrors M1 and M3 have concave reflective surfaces, and the second mirror M2 has a convex reflective surface. The concave reflective surface of the first mirror M1 permits the second light source located near the entrance end surface t1 of the rod integrator RI to be re-imaged to form a tertiary light source near the convex reflective surface of the second mirror M2. The light from the tertiary light source is directed to the display panel PA by the concave reflective surface of the third mirror M3. The light that has struck the display panel PA is reflected by the individual micromirrors thereof, which are each in either an ON or an OFF state (for example, inclined at either end of ±12°), and is thereby spatially modulated. Here, only the light reflected from micromirrors in their ON state enters the projection optical system PL, and is then efficiently directed to the entrance pupil SP of the projection optical system PL by the optical power of the concave reflective surface of the third mirror M3. The light is then projected through the projection optical system PL onto the screen SC.

In the second embodiment, as described above, the reflection optical system has only two concave reflective surfaces and one convex reflective surface as optical surfaces having optical powers. This makes it possible to reduce the number of components used in the illumination optical system and thereby make it compact. Moreover, since no chromatic aberration is produced, no unevenness in color results. This helps reduce the lowering of illuminance. Thus, it is possible to use optical components that are compact and advantageous in terms of mass production and costs while maintaining satisfactory optical performance. In this way, it is possible to reduce the size and cost of the display apparatus and simultaneously enhance the performance thereof.

Moreover, as will be understood from the optical path shown in FIG. 15, the projection optical system PL is designed to be obliquely nontelecentric toward the display panel PA, and is so arranged that rays are condensed from the display panel PA to the entrance pupil SP of the projection optical system PL. Using a nontelecentric optical system has the advantage of making the projection optical system compact, but has the disadvantage of making larger the optical element included in the illumination optical system that functions as a condenser lens. In this embodiment, the first and third mirrors M1 and M3, which each have a concave reflective surface, are used as optical elements having optical powers in the illumination optical system, and the second mirror M2, which has a convex reflective surface and a negative optical power, is arranged near the illumination optical system pupil SL (i.e., near the tertiary light source). This permits rays at different image heights (i.e., at different positions on the panel surface (image surface) of the display panel PA) to be incident on the third mirror M3, which functions as a condenser lens, with great differences in angle of incidence from one another. This makes it possible to efficiently spread rays in a small space and thereby build an illumination optical system suitable for a projection optical system PL that is nontelecentric toward the display panel PA.

In the second embodiment, the first mirror M1, which functions as a relay lens, is disposed between the exit end surface t2 of the rod integrator RI and the illumination optical system pupil SL, and the first mirror M1 is given an optical power that makes the entrance end surface t1 of the rod integrator RI conjugate with the illumination optical system pupil SL. Moreover, the third mirror M3, which functions as a condenser lens, is disposed between the illumination optical system pupil SL and the display panel PA, and the third mirror M3 is given an optical power that, when combined with that of the part of the projection optical system PL located on the display panel PA side of the projection optical system pupil SP, makes the illumination optical system pupil SL conjugate with the projection optical system pupil SP. In addition, the first mirror M1, which functions as a relay lens, and the third mirror M3, which functions as a condenser lens, are so arranged as to make the exit end surface t2 of the rod integrator RI conjugate with the panel surface of the display panel PA. In this construction, the light exiting from the rod integrator RI through the exit end surface t2 thereof can be efficiently directed to the small-size display panel PA, and the light reflected from this panel surface can be efficiently directed to the projection optical system PL. This makes it possible to alleviate the lowering of illuminance while maintaining high optical performance in the illumination optical system. Moreover, it is possible to reduce the cost and size of the display apparatus.

Moreover, between the first and third mirrors M1 and M3, which each have a concave reflective surface, the second mirror M2, which has a convex reflective surface, bends the optical path so that the optical axis of the rod integrator RI is substantially parallel to the optical axis of the projection optical system PL, and that the direction of the optical axis of the rod integrator RI is substantially coincident with the direction normal to the panel surface of the display panel PA. It is preferable, in this way, to dispose a convex reflective surface between two concave reflective surfaces so that the optical axis of the rod integrator RI is substantially parallel to the optical axis of the projection optical system PL or that the direction of the optical axis of the rod integrator RI is substantially coincident with the direction normal to the panel surface of the display panel PA. Bending the optical path between the first and third mirrors M1 and M3 makes it possible to make the optical construction of the display apparatus as a whole compact. It is also possible to unify the design reference axis and thereby reduce errors, simplify position adjustment, obtain more freedom in layout, and obtain other advantages. Moreover, it is preferable, as shown in FIG. 22, to form the first and third mirrors M1 and M3 as a single component and thereby integrate the two concave reflective surfaces together into a single component. This makes it possible to reduce the number of components, reduce errors, and enhance accuracy.

The concave reflective surfaces formed on the first and third mirrors M1 and M3 and the convex reflective surface formed on the second mirror M2 are all free-form surfaces. In a case where, as in this embodiment, an illumination optical system is composed solely of optical powers of reflective surfaces, using a free-form surface as at least one of those reflective surfaces makes it possible to enhance illumination efficiency accordingly. For example, in a case where a Digital Micromirror Device is used as the display panel PA, oblique illumination of its panel surface is essential. Using a free-form surface makes it possible to satisfactorily correct aberrations such as distortion even in oblique illumination. This makes it possible to efficiently direct light to the entrance pupil SP of the projection optical system PL and thereby achieve brighter display. That is, it is possible to enhance the imaging performance (how free from unsharpness and distortion) on the display panel PA, which is conjugate with the exit end surface t2 of the rod integrator RI. Thus, it is possible to efficiently condense the light reflected from the display panel PA at the entrance pupil SP of the projection optical system PL and thereby enhance illumination efficiency. It is also possible reduce position-to-position variation of luminance within the image and thereby reduce unevenness in brightness.

In the second embodiment, the reason that free-form surfaces are used as the concave reflective surfaces of the first and third mirrors M1 and M3 is that using free-form surfaces as the concave reflective surface closest to the display panel PA and as the concave reflective surface closest to the exit end surface t2 of the rod integrator RI is effective in enhancing illumination efficiency and reducing brightness unevenness mentioned above. In a case where a Digital Micromirror Device is used as the display panel PA, using a free-form surface as the concave reflective surface closest to the display panel PA makes it possible to efficiently direct the illumination light reflected from micromirrors in their ON state to the projection optical system pupil SP. This makes it possible to effectively enhance illumination efficiency and reduce brightness unevenness. Moreover, using a free-form surface as the concave reflective surface closest to the exit end surface t2 of the rod integrator RI makes it possible to satisfactorily correct the aberrations produced when the exit end surface t2 is imaged on the display panel PA. This makes it possible to further effectively enhance illumination efficiency by reducing distortion and unsharpness.

Assuming that the vertical and horizontal directions of the panel surface of the display panel PA are the y-axis and z-axis directions, respectively, the concave reflective surfaces of the first and third mirrors M1 and M3 are both free-form surfaces that are shaped asymmetrically in each of the y-axis and z-axis directions. It is preferable, in this way, to use as at least one of the concave reflective surfaces included in the reflection optical system a free-form surface that is shaped asymmetrically in each of the y-axis and z-axis directions. This makes it easy to control the directions in which rays are reflected at different positions on the concave reflective surface, and thus helps enhance optical performance in terms of imaging and distortion. Moreover, in this embodiment, as will be understood from FIGS. 13 and 14, the object surface (the exit end surface t2 of the rod integrator RI) and the image surface (the panel surface of the display panel PA) are large mainly in the z-axis direction, and the free-form surfaces used as the individual concave reflective surfaces are optimized so as to have shapes that reflect such a layout.

It is preferable that the concave reflective surface having the free-form surface fulfill condition (i) noted earlier with respect to the radius of curvature thereof at the point at which the ray traveling from the center of the exit end surface t2 of the rod integrator RI through the display panel PA to the center of the entrance pupil SP of the projection optical system PL strikes the concave reflective surface having the free-form surface, and that this free-form surface not have plane-symmetry. This construction makes it possible to enhance optical performance, reduce distortion, and enhance imaging performance. This in turn makes it possible to enhance illumination efficiency.

The substrates on which the reflective surfaces of the mirrors M1 to M3 are formed may be made of any material, such as glass, plastics, metal, or ceramics to suit the actual needs. For example, to prevent deterioration of imaging performance resulting from variation in temperature, it is preferable to use a material that suffers little shape change, such as glass. To reduce costs, it is preferable to use a plastic material such as PMMA (polymethyl metharcylate) or PC (polycarbonate). To obtain high illumination efficiency, the substrate needs to be coated with a coating having high reflectivity; specifically, on the substrate is formed a metal reflective thin film of Al (aluminum), Ag (silver), or the like, or an enhanced reflection film coated with a dielectric layer. The substrate may be coated with, instead, a multiple-layer film composed of several tens of dielectric layers. This is preferable because, as opposed to in a case where a metal film is used, light is not absorbed by metal and thus is not converted into heat during actual use. It is preferable that the reflectivity of the reflective surface to visible light be largely 90% or higher.

Hereinafter, practical examples of the optical construction of the illumination optical systems described above will be presented with reference to their construction data and other data. Examples 1 and 2 described below are numerical examples that respectively correspond to the first and second embodiments described above. Tables 1 and 2 show the construction data of Examples 1 and 2, respectively. The construction data of each example shows, within the system starting with the exit end surface t2 of the rod integrator RI and ending with the panel surface of the display panel PA, the arrangement of the individual optical elements and their respective optical data, such as their surface shape, in the order from the light source L1 side. The arrangement of each optical element is given by assuming a local rectangular coordinate system (x, y, z) having its origin (o) at the vertex of the optical surface of the optical element and then expressing the origin (o) and the x-axis and y-axis vectors (vx and vy) of the local rectangular coordinate system in terms of coordinates (X, Y, Z) in a global rectangular coordinate system (X, Y, Z) (in mm). For a centered optical element composed of two or more optical surfaces, the axial distance (T', mm) relative to the entrance side optical surface thereof is given. Thus, the direction of the axis of rotation symmetry in a centered optical block is given as the coordinates (X, Y, Z) of the vector (vx) normal to the surface at the origin (o).

The surface shape of each optical element is given as the curvature (C0, mm$^{-1}$) of the optical surface thereof. A free-form surface is defined by formula (FS) below, an expanded formula of an aspherical surface, using a local rectangular coordinate system (x, y, z) having its origin (o) at the vertex. Also shown for each optical surface are the refractive index (N) for the d-line of the medium located on the entrance side thereof, the refractive index (N') for the d-line of the medium located on the exit side thereof, the Abbe number (vd) of the optical material, and, where necessary, the effective radius (R) of the optical surface.

$$x = (C0 \cdot h^2)/(1 + \sqrt{1 - (1+\epsilon) \cdot C0^2 \cdot h^2}) + \Sigma[G(j,k) \cdot y^j \cdot z^k] \quad (FS)$$

where x represents the displacement from the reference surface in the x-axis direction, at the height h (relative to the vertex);

h represents the height in a direction perpendicular to the x-axis ($h^2 = y^2 + z^2$);

C0 represents the curvature at the vertex (the sign is determined with respect to the x-axis, a positive value indicating that the center of the curvature is located in the positive direction on the vector vx);

$\epsilon$ represents the quadric surface parameter; and

G(j, k) represent the expanded aspherical surface coefficient of order j with respect to y and of order k with respect to z (any coefficient that is not shown equals 0).

Figure 6:
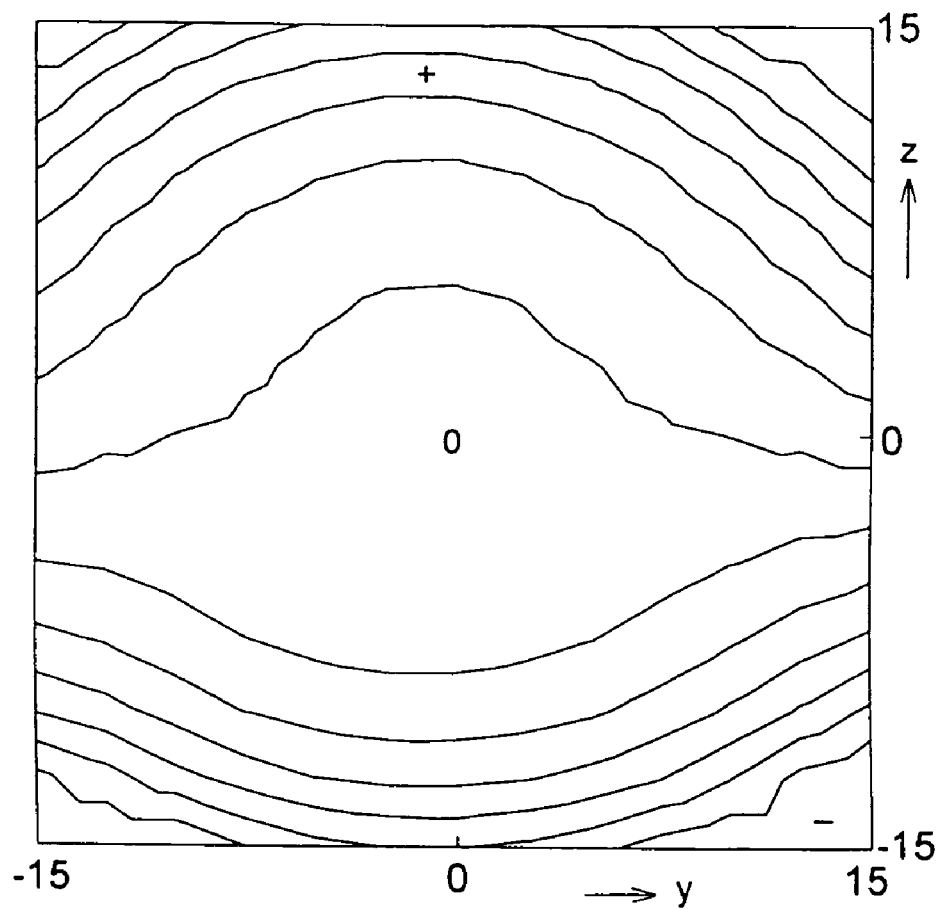
FIG. 6 is a graph showing the shape of the free-form reflective surface of the first mirror used in the illumination optical system in the display apparatus shown in FIGS. 1 to 4.
Figure 7:
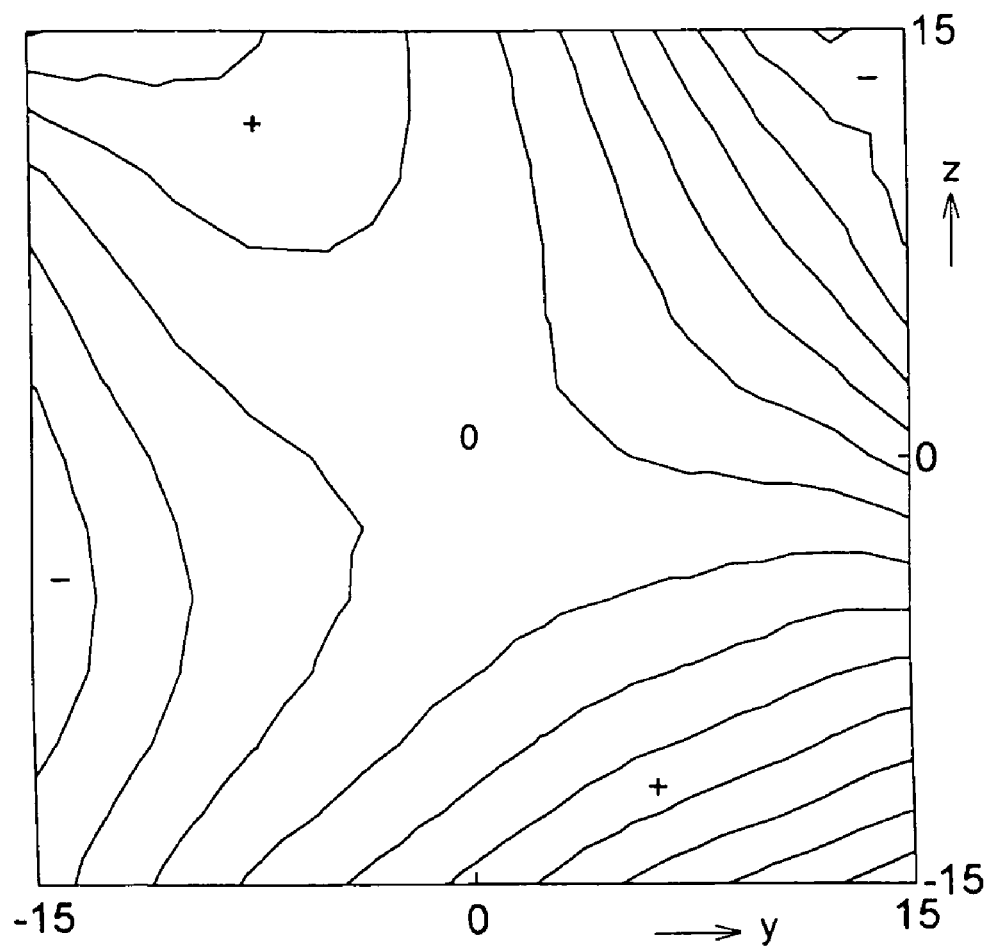
FIG. 7 is a graph showing the shape of the free-form reflective surface of the third mirror used in the illumination optical system in the display apparatus shown in FIGS. 1 to 4.
Figure 8:
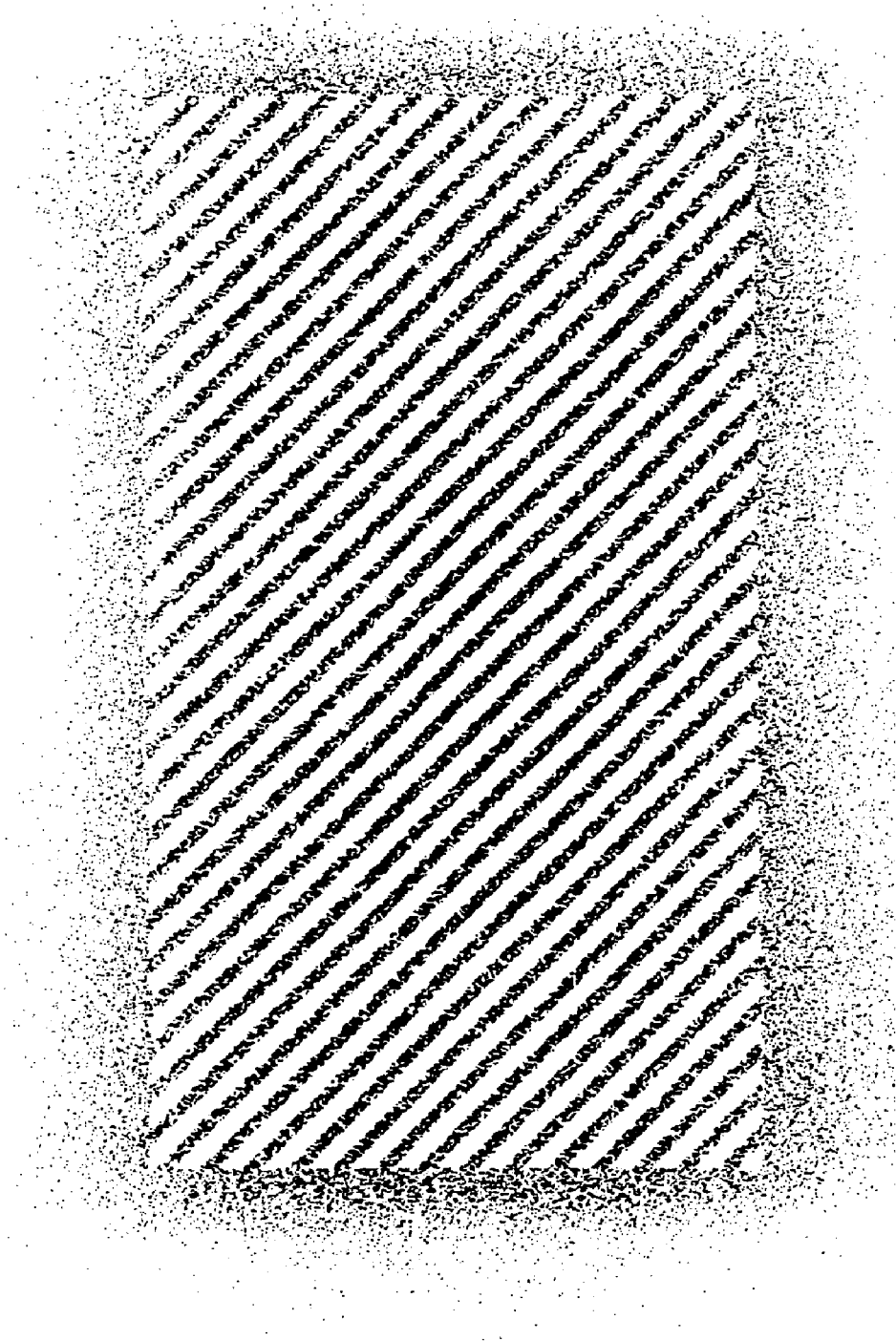
FIG. 8 is a diagram showing how the illumination light is reflected on the display panel in the display apparatus shown in FIGS. 1 to 4.
Figure 9:
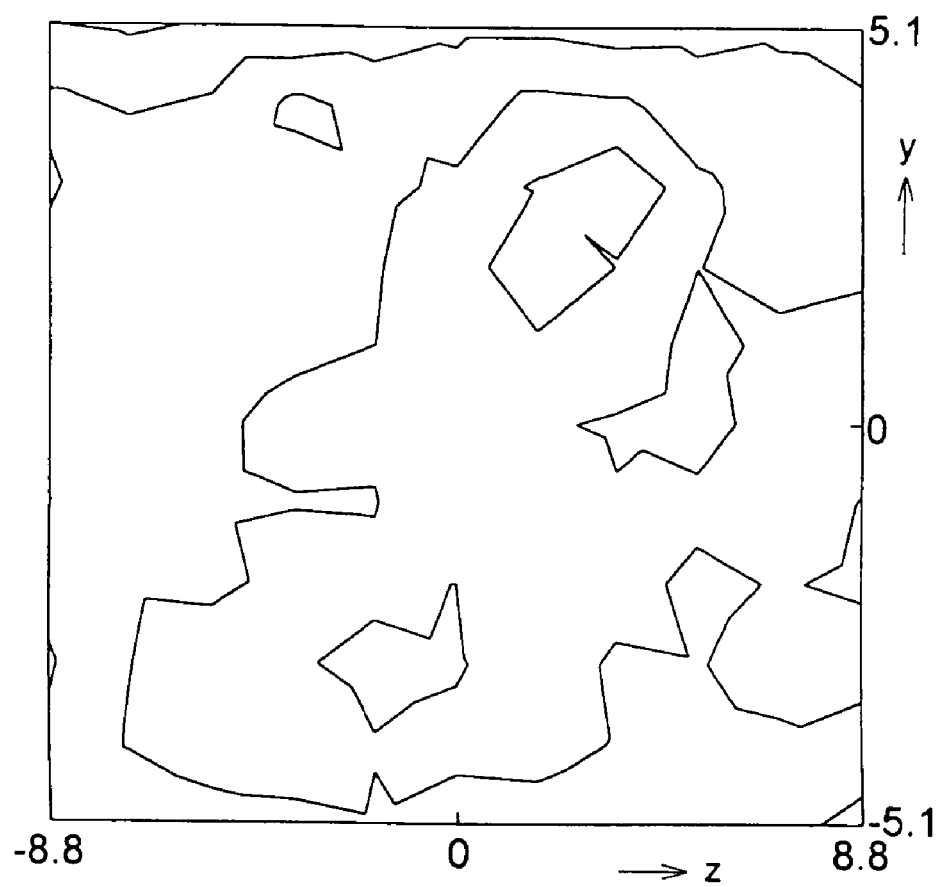
FIG. 9 is a diagram showing the illuminance distribution on the display panel in the display apparatus shown in FIGS. 1 to 4.
Figure 10:
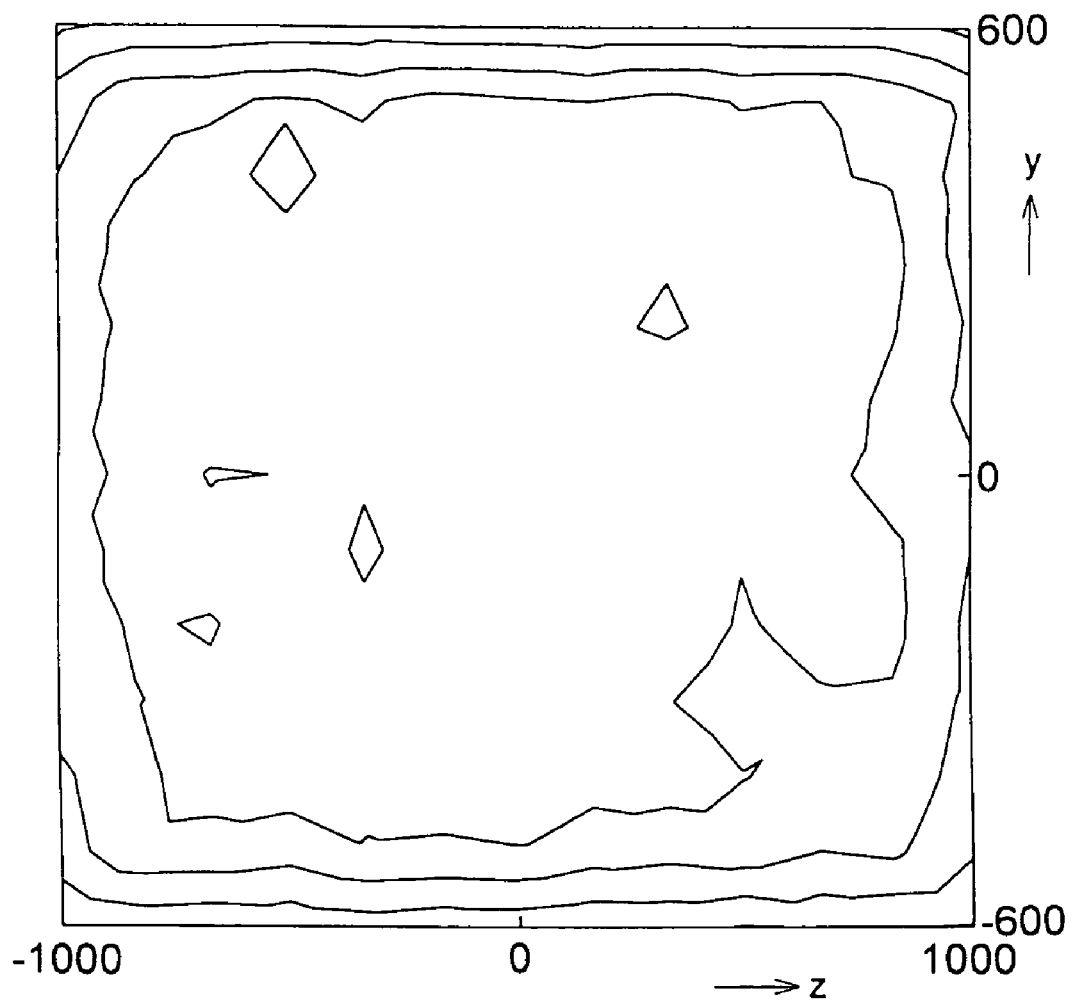
FIG. 10 is a diagram showing the illuminance distribution on the screen in the display apparatus shown in FIGS. 1 to 4.

With respect to Example 1, FIG. 6 shows the free-form surface shape of the concave reflective surface of the first mirror M1, and FIG. 7 shows the free-form surface shape of the concave reflective surface of the third mirror M3. The graphs shown in FIGS. 6 and 7 are each obtained by plotting the free-form surface shape of the respective concave reflective surface as displacements from a reference spherical surface having a radius of curvature that produces minimum displacements. Specifically, in FIG. 6, displacements from a spherical surface having a radius of curvature of −187.03 mm are plotted with a pitch of 0.75 mm, and, in FIG. 7, displacements from a spherical surface having a radius of curvature of −68.96 mm are plotted with a pitch of 0.25 mm. In each graph, a portion marked with a "−" sign is a concave surface, and a portion marked with a "+" sign is a convex surface. FIG. 8 shows how the illumination light is reflected on the panel surface of the display panel PA (the portion with a zebra pattern is the area of the panel surface of the Digital Micromirror Device). FIG. 9 shows the illuminance distribution on the panel surface of the display panel PA, and FIG. 10 shows the illuminance distribution on the screen SC.

Now, the asymmetry of the free-form surface shapes will be described more specifically. Assuming that the ray traveling from the center of the exit end surface t2, i.e., the object surface, of the rod integrator RI through substantially the center of the illumination optical system pupil SL to the center of the panel surface of the display panel PA, i.e., the image surface, is the principal ray, Example 1 is so designed that the principal ray, when passing through each surface, passes near the origin (o) of the local coordinate system (x, y, z) of that surface. Accordingly, the radii of curvature CRy and CRz of the free-form surfaces in the y-axis and z-axis directions near their respective origins (o) are calculated as First Mirror M1: CRy=−55.06, CRz=−63.82

Third Mirror M3: CRy=−139.37, CRz=−157.05

Since these surfaces are both free-form surfaces, they each have different radii of curvature in the y-axis and z-axis directions. What is to be noted here is that the radii of curvature in the y-axis direction are significantly smaller (on an absolute-value basis) than those in the decentered direction (z-axis direction). Accordingly, at the position at which the principal ray traveling from the center of the object surface t2 through the center of the illumination optical system pupil SL passes through each surface, formula (I) below holds.

|Radius of Curvature in Decentered Direction|>|Radius of Curvature in Direction Perpendicular to Decentered Direction|     (I)

More strictly, let the position at which a ray traveling from a point slightly deviated vertically (in the y-axis direction) from the center of the object surface t2 through the center of the illumination optical system pupil SL to the image surface (i.e., the panel surface of the display panel PA) passes through each surface be Py, and let the position at which the aforementioned principal ray passes through each surface be P0. Then, if it is assumed that the y-axis direction of the local coordinate system of each surface is the direction of the vector from the point P0 to the point Py as projected on a plane perpendicular to the normal vector to the surface (the z-axis direction is determined by the normal vector and the y-axis vector), and it is assumed that the optical system is decentered mainly in the horizontal direction of the image surface (i.e., in the Z-axis direction in the image surface coordinate system, i.e., the global coordinate system), formula (II) below holds.

|Radius of Curvature in y-axis Direction of Each Local Coordinate System|<|Radius of Curvature in z-axis Direction of Each Local Coordinate System|     (II)

In Example 1, used as the y-axis direction of the local coordinate system of each surface is the vector that lies on the plane including both the y-axis direction vector of the image surface coordinate system (i.e., the global coordinate system) and the normal vector to the surface in the local coordinate system and that is perpendicular to the normal vector. However, in a case where the y-axis direction of a local coordinate system is determined in the manner describe above, formula (II) can be used. Alternatively, the optical system may be built in the following manner. The normal vector to each surface is taken along the bisector line of the angle formed between the incident ray and the exiting ray when the principal ray passes through the surface, the normal vector pointing in the direction in which the incident ray travels. Then, the y-axis direction of the local coordinate system is determined as the direction that is perpendicular to the normal vector and that is perpendicular to the plane including both the incident and exiting rays. Then, the z-axis direction is determined as the direction perpendicular to both the normal vector and the y-axis vector. Here, it is preferable that the optical system be so built that the radii of curvature in the y-axis and z-axis directions fulfill the relationship defined by formula (II).

Figure 16:
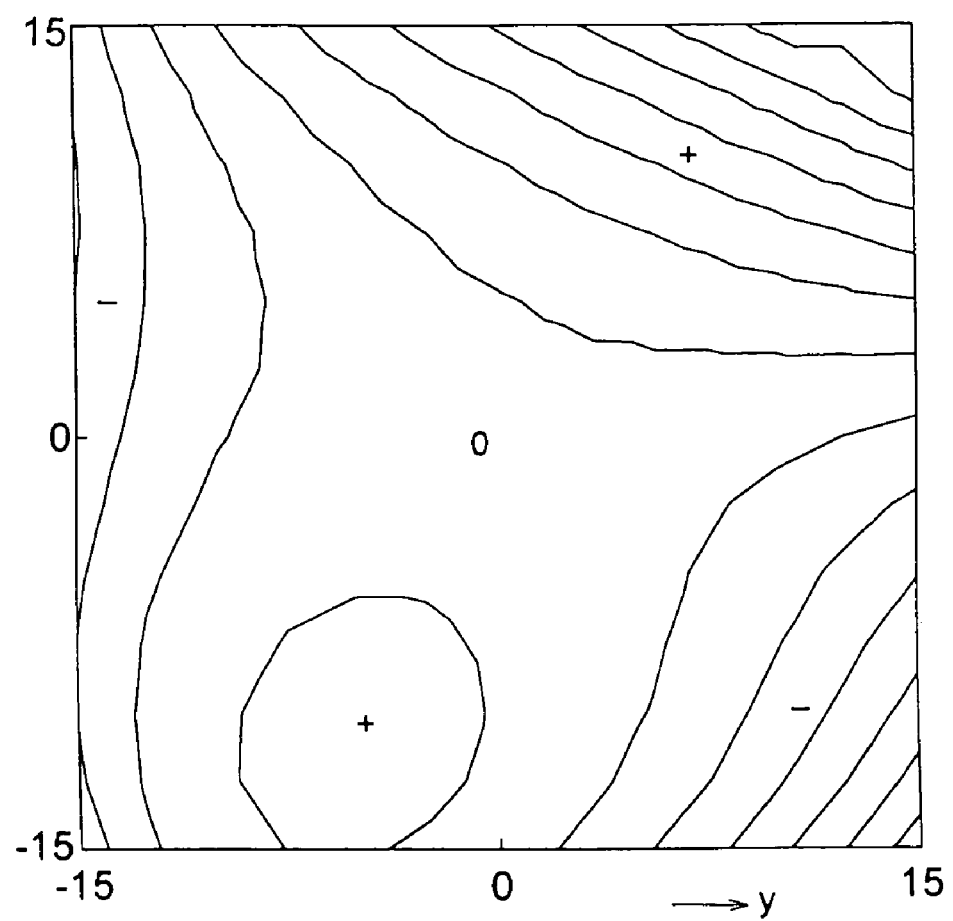
FIG. 16 is a graph showing the shape of the free-form reflective surface of the first mirror used in the illumination optical system in the display apparatus shown in FIGS. 11 to 14.
Figure 17:
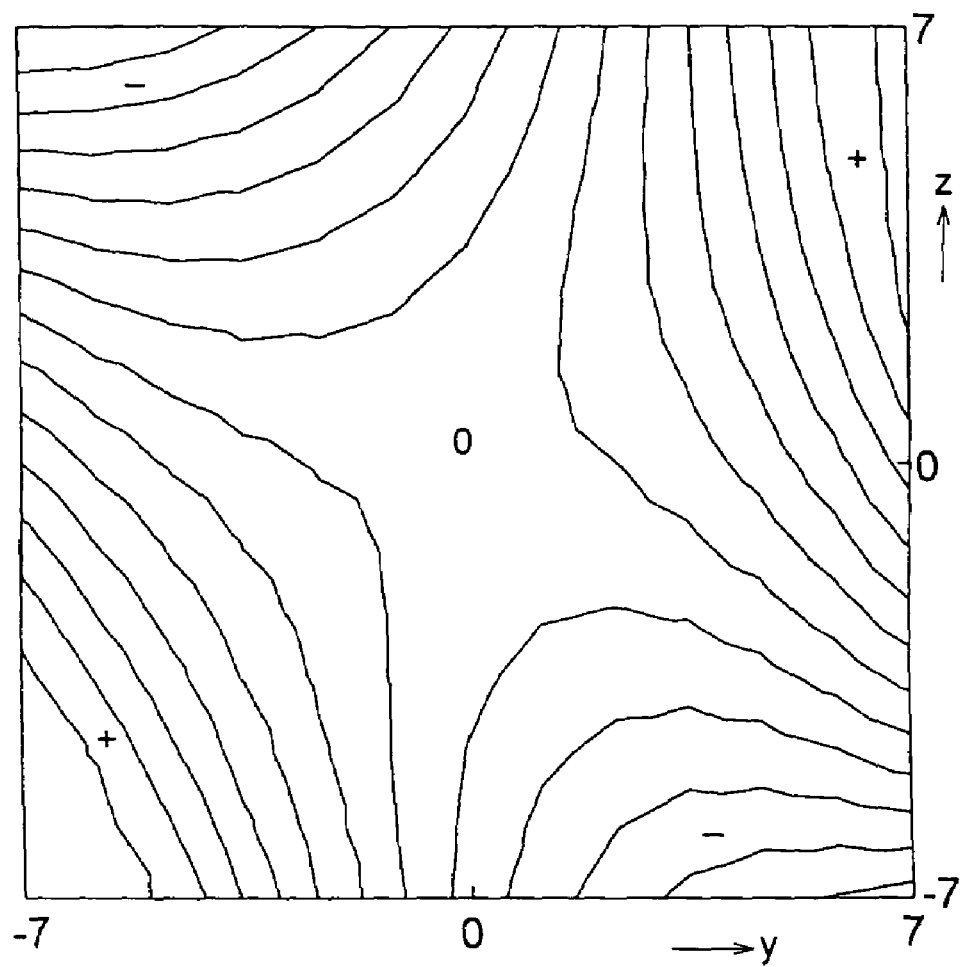
FIG. 17 is a graph showing the shape of the free-form reflective surface of the second mirror used in the illumination optical system in the display apparatus shown in FIGS. 11 to 14.
Figure 18:
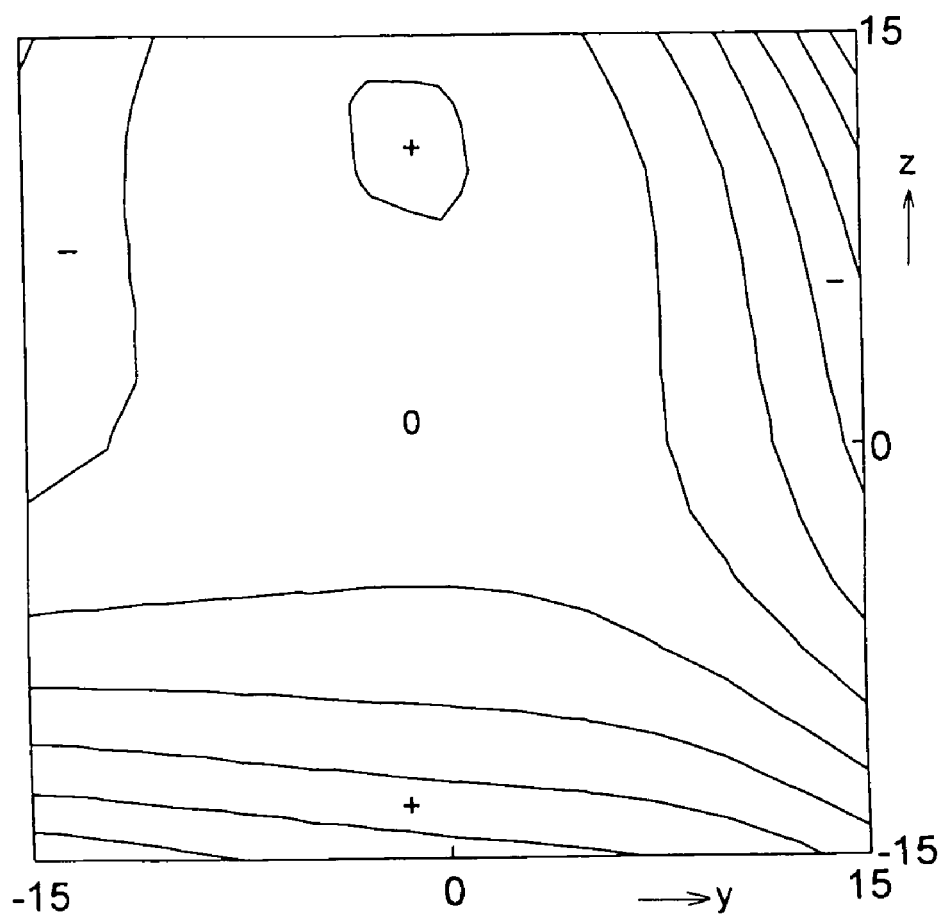
FIG. 18 is a graph showing the shape of the free-form reflective surface of the third mirror used in the illumination optical system in the display apparatus shown in FIGS. 11 to 14.
Figure 19:
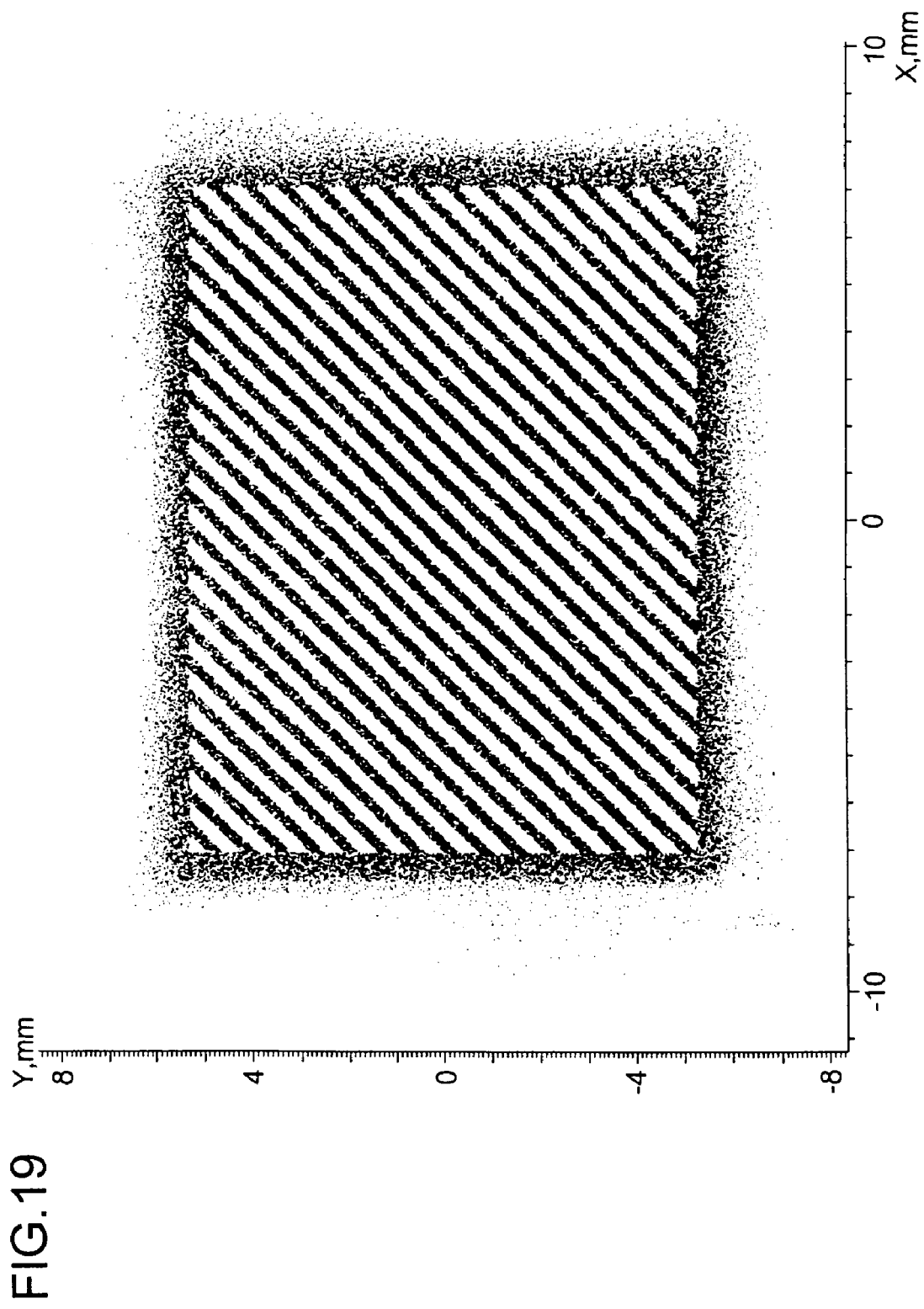
FIG. 19 is a diagram showing how the illumination light is reflected on the display panel in the display apparatus shown in FIGS. 11 to 14.
Figure 20:
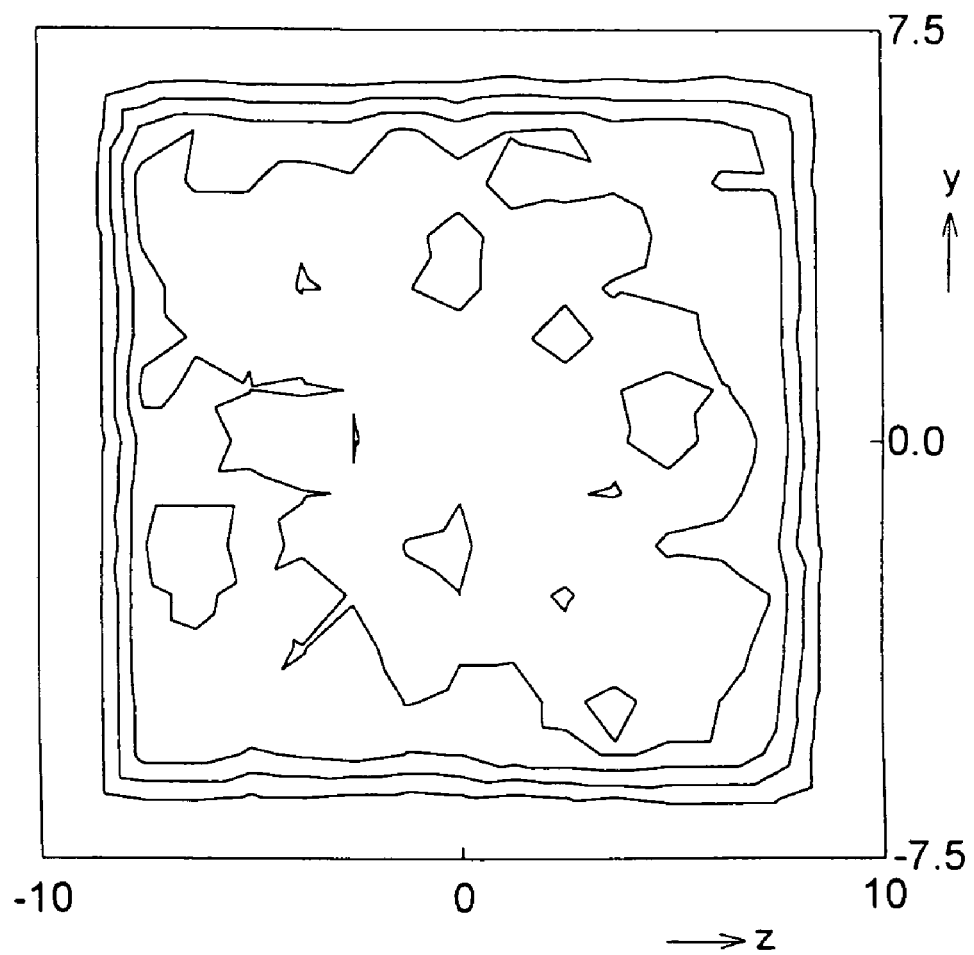
FIG. 20 is a diagram showing the illuminance distribution on the display panel in the display apparatus shown in FIGS. 11 to 14.
Figure 21:
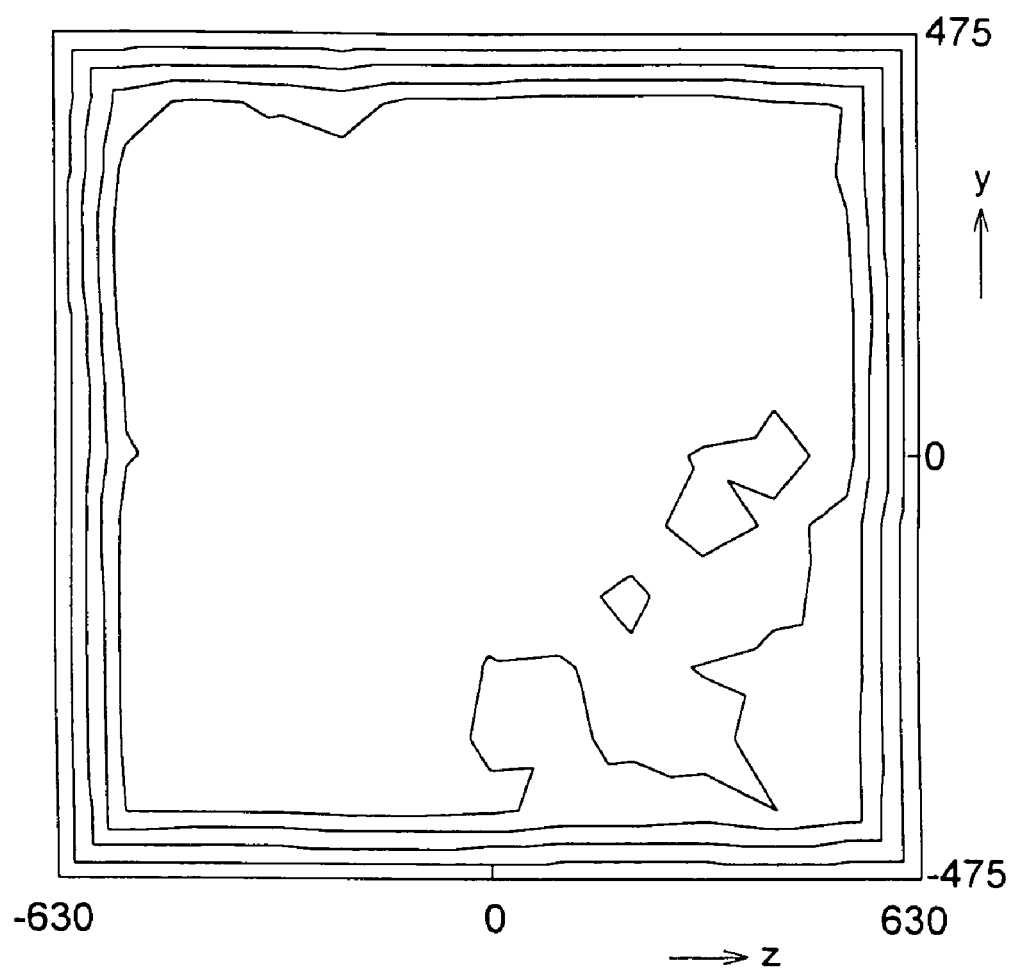
FIG. 21 is a diagram showing the illuminance distribution on the screen in the display apparatus shown in FIGS. 11 to 14.

With respect to Example 2, FIG. 16 shows the free-form surface shape of the concave reflective surface of the first mirror M1, FIG. 17 shows the free-form surface shape of the convex reflective surface of the first mirror M2, and FIG. 18 shows the free-form surface shape of the concave reflective surface of the third mirror M3. The graphs shown in FIGS. 16 and 18 are each obtained by plotting the free-form surface shape of the respective concave or convex reflective surface as displacements from a reference spherical surface having a radius of curvature that produces minimum displacements. Specifically, in FIG. 16, displacements from a spherical surface having a radius of curvature of −267.17 mm are plotted with a pitch of 0.75 mm; in FIG. 17, displacements from a spherical surface having a radius of curvature of 286.69 mm are plotted with a pitch of 0.75 mm; in FIG. 18, displacements from a spherical surface having a radius of curvature of −163.94 mm are plotted with a pitch of 0.75 mm. In each graph, a portion marked with a "−" sign is a concave surface, and a portion marked with a "+" sign is a convex surface. FIG. 19 shows how the illumination light is reflected on the panel surface of the display panel PA (the portion with a zebra pattern is the area of the panel surface of the Digital Micromirror Device). FIG. 20 shows the illuminance distribution on the panel surface of the display panel PA, and FIG. 21 shows the illuminance distribution on the screen SC.

Now, the asymmetry of the free-form surface shapes will be described more specifically. Assuming that the ray traveling from the center of the exit end surface t2, i.e., the object surface, of the rod integrator RI through substantially the center of the illumination optical system pupil SL to the center of the panel surface of the display panel PA, i.e., the image surface, is the principal ray, Example 2 is so designed that the principal ray, when passing through each surface, passes near the origin (o) of the local coordinate system (x, y, z) of that surface. Accordingly, the radii of curvature CRy and CRz of the free-form surfaces in the y-axis and z-axis directions near their respective origins (o) are calculated as First Mirror M1: CRy=−36.37, CRz=−39.26
Second Mirror M2: CRy=27.96, CRz=47.60
Third Mirror M3: CRy=−57.26, CRz=−66.95

Since these surfaces are all free-form surfaces, they each have different radii of curvature in the y-axis and z-axis directions. What is to be noted here is that the radii of curvature in the y-axis direction are significantly smaller (on an absolute-value basis) than those in the decentered direction (z-axis direction). Accordingly, at the position at which the principal ray traveling from the center of the object surface t2 through the center of the illumination optical system pupil SL passes through each surface, formula (I) noted earlier holds.

More strictly, let the position at which a ray traveling from a point slightly deviated vertically (in the y-axis direction) from the center of the object surface t2 through the center of the illumination optical system pupil SL to the image surface (i.e., the panel surface of the display panel PA) passes through each surface be Py, and let the position at which the aforementioned principal ray passes through each surface be P0. Then, if it is assumed that the y-axis direction of the local coordinate system of each surface is the direction of the vector from the point P0 to the point Py as projected on a plane perpendicular to the normal vector to the surface (the z-axis direction is determined by the normal vector and the y-axis vector), and it is assumed that the optical system is decentered mainly in the horizontal direction of the image surface (i.e., in the Z-axis direction in the image surface coordinate system, i.e., the global coordinate system), formula (II) noted earlier holds.

In Example 2, used as the y-axis direction of the local coordinate system of each surface is the vector that lies on the plane including both the y-axis direction vector of the image surface coordinate system (i.e., the global coordinate system) and the normal vector to the surface in the local coordinate system and that is perpendicular to the normal vector. However, in a case where the y-axis direction of a local coordinate system is determined in the manner describe above, formula (II) can be used. Alternatively, the optical system may be built in the following manner. The normal vector to each surface is taken along the bisector line of the angle formed between the incident ray and the exiting ray when the principal ray passes through the surface, the normal vector pointing in the direction in which the incident ray travels. Then, the y-axis direction of the local coordinate system is determined as the direction that is perpendicular to the normal vector and that is perpendicular to the plane including both the incident and exiting rays. Then, the z-axis direction is determined as the direction perpendicular to both the normal vector and the y-axis vector. Here, it is preferable that the optical system be so built that the radii of curvature in the y-axis and z-axis directions fulfill the relationship defined by formula (II).

As described above, in the embodiments described above, a reflection optical system includes, as optical surfaces having optical powers, only a first and a second concave reflective surface, or only a first and a second concave reflective surface and a convex reflective surface. The first concave reflective surface forms a tertiary light source from a secondary light source, and the second concave reflective surface efficiently directs the light from the tertiary light source to the entrance pupil of a projection optical system. This makes it possible to realize an inexpensive, compact projection-type display apparatus while maintaining high optical performance in an illumination optical system. Moreover, using an asymmetric free-form concave reflective surface makes it possible to effectively enhance illumination efficiency and reduce brightness unevenness, and disposing a flat or convex reflective surface between the first and second concave reflective surfaces makes it possible to make the optical construction of a display apparatus as a whole compact.

TABLE 1

Example 1

Exit End Surface t2 of Rod Integrator RI

Rod Size (Hollow): 3.9 mm (Height) × 6.7 mm (Width) × 35 mm (Length)
o: (−14.02584, 12.00438, −76.96887)
vx: (−1.00000000, 0.00000000, 0.00000000)
vy: (0.00000000, −0.99838995, −0.05672304)
N = 1.00000
C0 = 0.00000000
N' = 1.00000
Concave Reflective Surface of First Mirror M1 o: (−46.47675, 12.00438, −76.96887)
vx: (−1.00000000, 0.00000000, 0.00000000)
vy: (0.00000000, −0.99838995, −0.05672304)
N = 1.00000
C0 = 0.00000000
$\epsilon$ = 1.00000000
G(1, 0) = 0.000306699905
G(2, 0) = −0.00908106398
G(3, 0) = −8.07892955 × $10^{-7}$
G(4, 0) = −1.98717695 × $10^{-6}$
G(5, 0) = 1.08512241 × $10^{-8}$
G(6, 0) = 5.58684963 × $10^{-9}$
G(7, 0) = −3.34949549 × $10^{-11}$
G(8, 0) = −4.91483340 × $10^{-12}$
G(0, 1) = 0.329970530
G(1, 1) = 0.000231084778
G(2, 1) = 0.000105566790
G(3, 1) = −6.04445485 × $10^{-8}$
G(4, 1) = 1.65959977 × $10^{-7}$
G(5, 1) = 1.77506594 × $10^{-9}$
G(6, 1) = −5.46257539 × $10^{-10}$
G(7, 1) = 1.22613569 × $10^{-12}$
G(0, 2) = −0.00914828809
G(1, 2) = −3.36307029 × $10^{-6}$
G(2, 2) = −3.79663012 × $10^{-6}$
G(3, 2) = 5.24678841 × $10^{-8}$
G(4, 2) = 2.92382569 × $10^{-9}$
G(5, 2) = −2.62911765 × $10^{-10}$
G(6, 2) = 4.72402181 × $10^{-12}$
G(0, 3) = 8.05884647 × $10^{-5}$
G(1, 3) = 8.31497717 × $10^{-8}$ TABLE 1-continued Example 1

G(2, 3) = −8.33084401 × $10^{-8}$
G(3, 3) = −2.32070916 × $10^{-9}$
G(4, 3) = 3.34976119 × $10^{-10}$
G(5, 3) = 9.96252911 × $10^{-12}$
G(0, 4) = −2.36232594 × $10^{-6}$
G(1, 4) = 3.33590529 × $10^{-8}$
G(2, 4) = 4.93651852 × $10^{-9}$
G(3, 4) = −2.69043165 × $10^{-11}$
G(4, 4) = −2.72594071 × $10^{-11}$
G(0, 5) = 9.08689438 × $10^{-8}$
G(1, 5) = −8.86313676 × $10^{-10}$
G(2, 5) = 1.71838290 × $10^{-10}$
G(3, 5) = 2.57328687 × $10^{-12}$
G(0, 6) = −2.79012040 × $10^{-10}$
G(1, 6) = −7.54028329 × $10^{-11}$
G(2, 6) = −6.20207234 × $10^{-12}$
G(0, 7) = −1.08926425 × $10^{-10}$
G(1, 7) = 2.60400479 × $10^{-12}$
G(0, 8) = 2.15734871 × $10^{-12}$
N' = −1.00000
Flat Reflective Surface of Second Mirror M2 o: (−10.00000, 10.44701, −50.00000)
vx: (0.94507308, 0.30159769, −0.12599885)
vy: (0.29066098, −0.95178425, −0.09809659)
N = 1.00000
C0 = 0.00000000
N' = −1.00000
Illumination Optical System Pupil SL)

o: (−21.12051, 0.11765, −32.15182)
vx: (−0.48205523, −0.44754084, 0.75321309)
vy: (0.21295825, −0.89376373, −0.39475965)
N = 1.00000
C0 = 0.00000000(R = 15)
N' = 1.00000
Concave Reflective Surface of Third Mirror M3 o: (−50.00020, −27.01956, 14.90964)
vx: (−0.70351808, −0.46400538, 0.53829483)
vy: (0.33768245, −0.88472575, −0.32129566)
N = 1.00000
C0 = 0.00000000
$\epsilon$ = 1.00000000
G(1, 0) = −0.0165717437
G(2, 0) = −0.00358908679
G(3, 0) = −2.96168772 × $10^{-6}$
G(4, 0) = −8.41908290 × $10^{-7}$
G(5, 0) = 1.09778063 × $10^{-7}$
G(6, 0) = 5.62907582 × $10^{-9}$
G(7, 0) = −3.56648227 × $10^{-10}$
G(8, 0) = −1.75864361 × $10^{-11}$
G(0, 1) = −0.00730596825
G(1, 1) = −0.000573447332
G(2, 1) = −2.26990751 × $10^{-5}$
G(3, 1) = −5.87353269 × $10^{-7}$
G(4, 1) = −4.21148102 × $10^{-9}$
G(5, 1) = 3.90388810 × $10^{-9}$
G(6, 1) = −8.27699273 × $10^{-11}$
G(7, 1) = −1.20079976 × $10^{-11}$
G(0, 2) = −0.00318395834
G(1, 2) = 9.26292117 × $10^{-7}$
G(2, 2) = −8.57133481 × $10^{-7}$
G(3, 2) = −1.15650143 × $10^{-7}$
G(4, 2) = −3.34437629 × $10^{-9}$
G(5, 2) = 4.84297082 × $10^{-10}$
G(6, 2) = 2.47858612 × $10^{-11}$
G(0, 3) = −1.26500601 × $10^{-5}$
G(1, 3) = 4.53962253 × $10^{-7}$
G(2, 3) = −5.34439218 × $10^{-9}$
G(3, 3) = 2.07178981 × $10^{-9}$
G(4, 3) = 5.26613238 × $10^{-10}$
G(5, 3) = 2.04221150 × $10^{-11}$
G(0, 4) = −6.68600297 × $10^{-7}$
G(1, 4) = −7.24724659 × $10^{-9}$
G(2, 4) = 5.29717438 × $10^{-9}$
G(3, 4) = −1.84848215 × $10^{-11}$

TABLE 1-continued

Example 1

G(4, 4) = 7.58382766 × $10^{-12}$
G(0, 5) = 9.43218162 × $10^{-9}$
G(1, 5) = −1.74670419 × $10^{-9}$
G(2, 5) = −6.08190477 × $10^{-11}$
G(3, 5) = −1.88709489 × $10^{-11}$
G(0, 6) = 1.34128868 × $10^{-9}$
G(1, 6) = 1.25465294 × $10^{-11}$
G(2, 6) = −1.36776768 × $10^{-11}$
G(0, 7) = −1.22396504 × $10^{-12}$
G(1, 7) = 1.49699829 × $10^{-12}$
G(0, 8) = −5.01105893 × $10^{-13}$
N' = −1.00000
Protective Glass Of Display Panel PA o: (−3.47000, 0.00000, 0.00000)
vx: (1.00000000, 0.00000000, 0.00000000)
vy: (0.00000000, −0.99838995, −0.05672304)
Entrance-Side Surface N = 1.00000
C0 = 0.00000000
N' = 1.51872(vd = 64.20)
T' = 3
Exit-Side Surface N = 1.51872(vd = 64.20)
C0 = 0.00000000
N' = 1.00000
Panel Surface Of Display Panel PA Panel Surface Size: 10.3 mm (Height) × 17.6 mm (Width)
o: (0.00000, 0.00000, 0.00000)
vx: (1.00000000, 0.00000000, 0.00000000)
vy: (0.00000000, 1.00000000, 0.00000000)
N = 1.00000
C0 = 0.00000000
N' = 1.00000

TABLE 2

Example 2

Exit End Surface t2 of Rod Integrator RI

Rod Size (Hollow): 4.6 mm (Height) × 6.0 mm (Width) × 35 mm (Length)
o: (−12.52107, 3.05866, −39.64591)
vx: (−1.00000000, 0.00000000, 0.00000000)
vy: (0.00000000, −0.99820322, 0.05991944)
N = 1.00000
C0 = 0.00000000(R = 5)
N' = 1.00000
Concave Reflective Surface of First Mirror M1 o: (−41.33527, 3.10193, −39.55098)
vx: (−0.95857762, 0.06805833, −0.27658093)
vy: (−0.08129889, −0.99601470, 0.03667717)
N = 1.00000
C0 = 0.00000000(R = 40)
ε = 1.00000000
G(2, 0) = −0.0137486758
G(3, 0) = 7.69369653 × $10^{-6}$
G(4, 0) = −2.73103198 × $10^{-6}$
G(5, 0) = 3.09617276 × $10^{-8}$
G(6, 0) = −2.37116543 × $10^{-9}$
G(1, 1) = 0.00105584634
G(2, 1) = 4.18767772 × $10^{-5}$
G(3, 1) = 5.61613760 × $10^{-7}$
G(4, 1) = 2.79116837 × $10^{-8}$
G(5, 1) = 4.73967352 × $10^{-11}$
G(0, 2) = −0.0127349809
G(1, 2) = 1.98296932 × $10^{-5}$
G(2, 2) = −4.34371416 × $10^{-6}$
G(3, 2) = 4.22461256 × $10^{-8}$

TABLE 2-continued

Example 2

G(4, 2) = −5.77284840 × $10^{-9}$
G(0, 3) = 3.30498082 × $10^{-5}$
G(1, 3) = 5.55474457 × $10^{-7}$
G(2, 3) = −1.46044715 × $10^{-8}$
G(3, 3) = −1.15904560 × $10^{-9}$
G(0, 4) = −2.84965213 × $10^{-6}$
G(1, 4) = −1.76414657 × $10^{-8}$
G(2, 4) = −5.49998668 × $10^{-9}$
G(0, 5) = 2.92804223 × $10^{-8}$
G(1, 5) = 5.50791982 × $10^{-10}$
G(0, 6) = −6.97119358 × $10^{-10}$
N' = −1.00000
Convex Reflective Surface of Second Mirror M2 o: (−14.22367, −1.16172, −22.31408)
vx: (0.97091384, 0.18113503, −0.15657717)
vy: (0.18809290, −0.98167131, 0.03070015)
N = 1.00000
C0 = 0.00000000(R = 25)
ε = 1.00000000
G(2, 0) = 0.0178820002
G(3, 0) = 0.000213270696
G(4, 0) = 8.22706597 × $10^{-5}$
G(5, 0) = −1.25388279 × $10^{-6}$
G(6, 0) = −5.10613749 × $10^{-7}$
G(1, 1) = 0.0107453444
G(2, 1) = −0.000256725232
G(3, 1) = 3.07727024 × $10^{-5}$
G(4, 1) = 1.52253321 × $10^{-6}$
G(5, 1) = −4.65793447 × $10^{-7}$
G(0, 2) = 0.0105036396
G(1, 2) = −0.000134655261
G(2, 2) = 8.68096963 × $10^{-5}$
G(3, 2) = −1.95783059 × $10^{-6}$
G(4, 2) = −1.90136899 × $10^{-6}$
G(0, 3) = −0.000196629234
G(1, 3) = 3.61087732 × $10^{-5}$
G(2, 3) = 1.86832839 × $10^{-6}$
G(3, 3) = −5.98419642 × $10^{-7}$
G(0, 4) = 2.97490792 × $10^{-5}$
G(1, 4) = 1.39290398 × $10^{-6}$
G(2, 4) = −4.92640739 × $10^{-7}$
G(0, 5) = 7.84668119 × $10^{-7}$
G(1, 5) = −1.43411637 × $10^{-7}$
G(0, 6) = −9.20215416 × $10^{-8}$
N' = −1.00000
Concave Reflective Surface of Third Mirror M3 o: (−36.11561, −16.77524, 8.86677)
vx: (−0.74451637, −0.42290617, 0.51657114)
vy: (0.37841238, −0.90479065, −0.19534063)
N = 1.00000
C0 = 0.00000000(R = 25)
ε = 1.00000000
G(2, 0) = −0.00873242887
G(3, 0) = −2.46799776 × $10^{-5}$
G(4, 0) = −1.26158367 × $10^{-6}$
G(5, 0) = 1.09512487 × $10^{-8}$
G(6, 0) = 8.57213501 × $10^{-10}$
G(1, 1) = 1.91616684 × $10^{-5}$
G(2, 1) = −4.45024449 × $10^{-5}$
G(3, 1) = −2.59113731 × $10^{-7}$
G(4, 1) = 2.33856641 × $10^{-8}$
G(5, 1) = −5.74487633 × $10^{-11}$
G(0, 2) = −0.00746828511
G(1, 2) = −1.38180616 × $10^{-5}$
G(2, 2) = −9.99415440 × $10^{-7}$
G(3, 2) = −8.46770639 × $10^{-9}$
G(4, 2) = −1.51120422 × $10^{-9}$
G(0, 3) = −4.12376382 × $10^{-5}$
G(1, 3) = −1.24855080 × $10^{-7}$
G(2, 3) = −2.72168969 × $10^{-8}$
G(3, 3) = −1.15056732 × $10^{-9}$
G(0, 4) = −8.21208513 × $10^{-7}$
G(1, 4) = −2.49445821 × $10^{-8}$
G(2, 4) = −1.82647511 × $10^{-9}$
G(0, 5) = 8.58604091 × $10^{-9}$

TABLE 2-continued

Example 2

G(1, 5) = −1.65956114 × 10$^{-11}$
G(0, 6) = −3.50847010 × 10$^{-10}$
N' = −1.00000
Protective Glass Of Display Panel PA o: (−3.50000, 0.16496, 0.59979)
vx: (1.00000000, 0.00000000, 0.00000000)
vy: (0.00000000, −0.99820322, 0.05991944)
Entrance-Side Surface N = 1.00000
C0 = 0.00000000(R = 11)
N' = 1.51872(vd = 64.20)
T' = 3
Exit-Side Surface N = 1.51872(vd = 64.20)
C0 = 0.00000000(R = 11)
N' = 1.00000
Panel Surface Of Display Panel PA Panel Surface Size: 10.5 mm (Height) × 14 mm (Width)
o: (0.00000, 0.00000, 0.00000)
vx: (1.00000000, 0.00000000, 0.00000000)
vy: (0.00000000, 1.00000000, 0.00000000)
N = 1.00000
C0 = 0.00000000(R = 25)
N' = 1.00000

What is claimed is:

1. An illumination optical system for use in a projection-type display apparatus that directs light from a light source through the illumination optical system to a display panel so that an image displayed on the display panel illuminated by the light directed thereto is projected through a projection optical system onto a screen, comprising:
   a light intensity uniformizing device of which an entrance surface is located at a first conjugate position that is substantially conjugate with the light source and of which an exit surface has a shape geometrically similar to a panel surface of the display panel; and
   a reflection optical system for forming an image of the exit surface of the light intensity uniformizing device on the panel surface of the display panel,
   wherein, each of at least two elements having an optical power, which is disposed between the exit surface of the light intensity uniformizing device and the display panel, is a reflective surface.

2. An illumination optical system for use in a projection-type display apparatus that directs light from a light source through the illumination optical system to a display panel so that an image displayed on the display panel illuminated by the light directed thereto is projected through a projection optical system onto a screen, comprising:
   a light intensity uniformizing device of which an entrance surface is located at a first conjugate position that is substantially conjugate with the light source and of which an exit surface has a shape geometrically similar to a panel surface of the display panel; and
   a reflection optical system for forming an image of the exit surface of the light intensity uniformizing device on the panel surface of the display panel, the reflection optical system including:
   a first concave reflective surface for forming between the display panel and the light intensity uniformizing device a second conjugate position that is conjugate with the first conjugate position of the light source; and
   a second concave reflective surface for making the second conjugate position substantially conjugate with an entrance pupil of the projection optical system.

3. An illumination optical system as claimed in claim 2, further comprising:
   a condenser optical system for condensing the light from the light source onto the entrance surface of the light intensity uniformizing device; and
   a color filter, disposed near the entrance surface or exit surface of the light intensity uniformizing device, for changing colors of light exiting from the light intensity uniformizing device on a time-division basis to achieve color display.

4. An illumination optical system as claimed in claim 2, wherein at least one of the first and second concave reflective surfaces is a free-form surface that is shaped asymmetrically in each of directions respectively parallel to vertical and horizontal directions of the panel surface of the display panel.

5. An illumination optical system as claimed in claim 4, wherein the concave reflective surface having the free-form surface fulfills the following condition with respect to a radius of curvature thereof at a point at which a ray traveling from a center of the exit surface of the light intensity uniformizing device through a center of the display panel to a center of the entrance pupil of the projection optical system strikes the concave reflective surface having the free-form surface, $|CRy|<|CRz|$ where
   CRz represents a radius of curvature as measured in a plane including both a ray incident on the concave reflective surface having the free-form surface and a ray reflected therefrom; and
   CRy represents a radius of curvature as measured in a plane that is perpendicular to the plane including both a ray incident on the concave reflective surface having the free-form surface and a ray reflected therefrom and that includes a normal vector to that concave reflective surface.

6. An illumination optical system as claimed in claim 2, wherein the reflective optical system further comprises:
   a flat reflective surface for reflecting light from the first concave reflective surface toward the second concave reflective surface.

7. An illumination optical system as claimed in claim 6, wherein the first and second concave reflective surfaces and the flat reflective surface are so arranged that a direction of an optical axis of the light intensity uniformizing device is substantially coincident with a direction normal to the panel surface of the display panel.

8. An illumination optical system as claimed in claim 2, wherein the reflective optical system further comprises, as a surface having an optical power:
   a convex reflective surface, disposed near the second conjugate position of the light source, for reflecting light from the first concave reflective surface toward the second concave reflective surface.

9. An illumination optical system as claimed in claim 8, wherein the first and second concave reflective surfaces and the convex reflective surface are so arranged that a direction of an optical axis of the light intensity uniformizing device is substantially coincident with a direction normal to the panel surface of the display panel.

10. An illumination optical system as claimed in claim 2, wherein the first and second concave reflective surfaces are integrated together into a single component.

11. An illumination optical system as claimed in claim 2, wherein, in the reflection optical system, every surface having an optical power is a reflective surface.

12. A projection-type display apparatus comprising:
a light source for emitting light;
a display panel for displaying an image;
a condenser optical system for condensing light from the light source at a first conjugate position;
a light intensity uniformizing device of which an entrance surface is located at the first conjugate position and of which an exit surface has a shape geometrically similar to a panel surface of the display panel;
a reflection optical system for forming an image of the exit surface of the light intensity uniformizing device on the panel surface of the display panel; and
a projection optical system for projecting the image displayed by the display panel onto a predetermined surface,
wherein, each of at least two elements having an optical power, which is disposed between the exit surface of the light intensity uniformizing device and the display panel, is a reflective surface.

13. A projection-type display apparatus as claimed in claim 12, wherein, in the projection optical system, every surface having an optical is a reflective surface.

14. A projection-type display apparatus as claimed in claim 12, wherein the light intensity uniformizing device is a rod integrator.

15. A projection-type display apparatus comprising:
a light source for emitting light;
a display panel for displaying an image;
a condenser optical system for condensing light from the light source at a first conjugate position;
a light intensity uniformizing device of which an entrance surface is located at the first conjugate position and of which an exit surface has a shape geometrically similar to a panel surface of the display panel;
a projection optical system for projecting the image displayed by the display panel onto a predetermined surface; and
a reflection optical system for forming an image of the exit surface of the light intensity uniformizing device on the panel surface of the display panel, the reflection optical system including:
a first concave reflective surface for forming between the display panel and the light intensity uniformizing device a second conjugate position that is conjugate with the first conjugate position; and
a second concave reflective surface for making the second conjugate position substantially conjugate with an entrance pupil of the projection optical system; system.

16. A projection-type display apparatus as claimed in claim 15, further comprising:
a color filter, disposed near the entrance surface or exit surface of the light intensity uniformizing device, for changing colors of light exiting from the light intensity uniformizing device on a time-division basis to achieve color display.

17. A projection-type display apparatus as claimed in claim 15, wherein at least one of the first and second concave reflective surfaces is a free-form surface that is shaped asymmetrically in each of directions respectively parallel to vertical and horizontal directions of the panel surface of the display panel.

18. A projection-type display apparatus as claimed in claim 17,
wherein the concave reflective surface having the free-form surface fulfills the following condition with respect to a radius of curvature thereof at a point at which a ray traveling from a center of the exit surface of the light intensity uniformizing device through a center of the display panel to a center of the entrance pupil of the projection optical system strikes the concave reflective surface having the free-form surface, $$|CRy| < |CRz|$$

where
CRz represents a radius of curvature as measured in a plane including both a ray incident on the concave reflective surface having the free-form surface and a ray reflected therefrom; and
CRy represents a radius of curvature as measured in a plane that is perpendicular to the plane including both a ray incident on the concave reflective surface having the free-form surface and a ray reflected therefrom and that includes a normal vector to that concave reflective surface.

19. A projection-type display apparatus as claimed in claim 15, wherein the reflective optical system further comprises:
a flat reflective surface for reflecting light from the first concave reflective surface toward the second concave reflective surface.

20. A projection-type display apparatus as claimed in claim 19, wherein the first and second concave reflective surfaces and the flat reflective surface are so arranged that a direction of an optical axis of the light intensity uniformizing device is substantially coincident with a direction normal to the panel surface of the display panel.

21. A projection-type display apparatus as claimed in claim 15, wherein the reflective optical system further comprises, as a surface having an optical power:
a convex reflective surface, disposed near the second conjugate position of the light source, for reflecting light from the first concave reflective surface toward the second concave reflective surface.

22. A projection-type display apparatus as claimed in claim 21, wherein the first and second concave reflective surfaces and the convex reflective surface are so arranged that a direction of an optical axis of the light intensity uniformizing device is substantially coincident with a direction normal to the panel surface of the display panel.

23. A projection-type display apparatus as claimed in claim 15, wherein the first and second concave reflective surfaces are integrated together into a single component.

24. A projection-type display apparatus as claimed in claim 15, wherein, in the reflection optical system, every surface having an optical power is a reflective surface.

25. A rear projection apparatus comprising:
a light source for emitting light;
a display panel for displaying an image;
a condenser optical system for condensing light from the light source at a first conjugate position;

a light intensity uniformizing device of which an entrance surface is located at the first conjugate position and of which an exit surface has a shape geometrically similar to a panel surface of the display panel;

a color filter, disposed near the entrance surface or exit surface of the light intensity uniformizing device, for changing colors of light exiting from the light intensity uniformizing device on a time-division basis to achieve color display;

a reflection optical system for forming an image of the exit surface of the light intensity uniformizing device on the panel surface of the display panel, the reflection optical system including at least two elements;

a projection optical system for projecting the image displayed by the display panel onto a predetermined surface; and a transmission-type screen onto which the projection optical system projects the image, wherein, each of the at least two elements of the reflection optical system having an optical power, which is disposed between the exit surface of the light intensity uniformizing device and the display panel, is a reflective surface.

* * * * *